United States Patent
Kim et al.

(10) Patent No.: US 12,096,446 B2
(45) Date of Patent: Sep. 17, 2024

(54) METHOD FOR TRANSMITTING AND RECEIVING SIGNALS IN WIRELESS COMMUNICATION SYSTEM AND APPARATUS FOR SUPPORTING SAME

(71) Applicant: LG Electronics Inc., Seoul (KR)

(72) Inventors: Seonwook Kim, Seoul (KR); Changhwan Park, Seoul (KR); Joonkui Ahn, Seoul (KR); Suckchel Yang, Seoul (KR); Sukhyon Yoon, Seoul (KR); Suhwan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 634 days.

(21) Appl. No.: 17/275,845

(22) PCT Filed: Sep. 20, 2019

(86) PCT No.: PCT/KR2019/012260
§ 371 (c)(1),
(2) Date: Mar. 12, 2021

(87) PCT Pub. No.: WO2020/060302
PCT Pub. Date: Mar. 26, 2020

(65) Prior Publication Data
US 2022/0046609 A1 Feb. 10, 2022

(30) Foreign Application Priority Data

Sep. 21, 2018 (KR) .......... 10-2018-0114498
Nov. 2, 2018 (KR) .......... 10-2018-0133624
Feb. 15, 2019 (KR) .......... 10-2019-0018261

(51) Int. Cl.
*H04W 72/23* (2023.01)
*H04W 16/14* (2009.01)
*H04W 74/08* (2024.01)

(52) U.S. Cl.
CPC .......... *H04W 72/23* (2023.01); *H04W 16/14* (2013.01); *H04W 74/08* (2013.01)

(58) Field of Classification Search
CPC ..... H04W 72/23; H04W 16/14; H04W 74/08; H04W 72/20; H04L 27/0006; H04L 5/0053
See application file for complete search history.

(56) References Cited

U.S. PATENT DOCUMENTS

2016/0254878 A1 9/2016 Wang et al.
2018/0132243 A1 5/2018 Yang et al.
(Continued)

FOREIGN PATENT DOCUMENTS

CN 106470438 3/2017
CN 107624265 1/2018
(Continued)

OTHER PUBLICATIONS

CATT, "Channel Access Procedures for NR Unlicensed Operations," R1-1806317, 3GPP TSG RAN WG1 Meeting #93, Busan, Korea, dated May 21-25, 2018, 6 pages.
(Continued)

*Primary Examiner* — Nizam U Ahmed
(74) *Attorney, Agent, or Firm* — Fish & Richardson P.C.

(57) ABSTRACT

Disclosed in various embodiments of the present disclosure are a method for transmitting and receiving signals in a wireless communication system and an apparatus for supporting same. More specifically, disclosed in various embodiments of the present disclosure are a method for transmitting and receiving downlink control information (DCI) in a wireless communication system, and an apparatus for supporting same.

8 Claims, 20 Drawing Sheets

(56) References Cited

U.S. PATENT DOCUMENTS

| | | | |
|---|---|---|---|
| 2019/0268883 A1* | 8/2019 | Zhang | H04L 5/0094 |
| 2021/0058964 A1* | 2/2021 | Hooli | H04L 5/0062 |
| 2021/0274534 A1* | 9/2021 | Takeda | H04W 76/11 |

FOREIGN PATENT DOCUMENTS

| | | |
|---|---|---|
| KR | 1020180049974 | 5/2018 |
| WO | WO 2017/030417 | 2/2017 |
| WO | WO2018084571 | 5/2018 |

OTHER PUBLICATIONS

PCT International Search Report and Written Opinion in International Appln. No. PCT/KR2019/012260, dated Jan. 17, 2020, 19 pages (with English translation).

Spreadtrum Communications, "Considerations on the channel access procedures for NR-U," R1-1806412, 3GPP TSG RAN WG1 Meeting #93, Busan, Korea, dated May 21-25, 2018, 5 pages.

Office Action in Chinese Appln. No. 201980061156.1, mailed on Jun. 28, 2023, 23 pages (with English translation).

* cited by examiner (a) Carrier aggregation between L-band and U-band (b) Standalone U-band(s)

METHOD FOR TRANSMITTING AND RECEIVING SIGNALS IN WIRELESS COMMUNICATION SYSTEM AND APPARATUS FOR SUPPORTING SAME

CROSS-REFERENCE TO RELATED APPLICATIONS

This application is a National Stage application under 35 U.S.C. § 371 of International Application No. PCT/KR2019/012260, filed on Sep. 20, 2019, which claims the benefit of Korean Application Nos. 10-2019-0018261, filed on Feb. 15, 2019, 10-2018-0133624, filed on Nov. 2, 2018, and 10-2018-0114498, filed on Sep. 21, 2018. The disclosures of the prior applications are incorporated by reference in their entirety.

TECHNICAL FIELD

Various embodiments of the present disclosure relate to a wireless communication system, and more particularly, to a method and apparatus for transmitting and receiving a signal in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Various embodiments of the present disclosure may provide a method and apparatus for transmitting and receiving signals in a wireless communication system.

Specifically, various embodiments of the present disclosure may provide a method and apparatus for transmitting and receiving downlink control information (DCI) in a wireless communication system.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solution

According to various embodiments of the present disclosure, a method of receiving downlink control information (DCI) by an apparatus in a wireless communication system may be provided.

In an exemplary embodiment, the method may include identifying at least one first subband occupied by a base station, among a plurality of subbands included in an unlicensed band, blind-decoding, based on a control resource set (CORESET) configured over the plurality of subbands and the at least one first subband, at least one first physical downlink control channel (PDCCH) candidate among a plurality of PDCCH candidates configured in the CORESET, and receiving the DCI based on the blind decoding.

In an exemplary embodiment, at least one first control channel element (CCE) occupied by the at least one first PDCCH candidate may be included in the at least one first subband.

In an exemplary embodiment, based on at least one second CCE being included in at least one second subband other than the at least one first subband among the plurality of subbands, among at least one second CCE occupied by a second PDCCH candidate among the plurality of PDCCH candidates, the second PDCCH candidate may not be blind-decoded.

In an exemplary embodiment, the at least one first subband may be identified based on: a predefined signal being received in the at least one first subband or information indicating the at least one first subband being included in the predetermined signal being received.

In an exemplary embodiment, each of the plurality of subbands may be related to a basic frequency unit of a channel access procedure (CAP) for the unlicensed band.

In an exemplary embodiment, the DCI may be received in at least one resource block (RB) other than a predetermined number of RBs from at least one boundary of the at least one first subband, among a plurality of RBs included in the at least one first subband.

According to various embodiments of the present disclosure, an apparatus for receiving DCI in a wireless communication system may be provided.

In an exemplary embodiment, the apparatus may include a processor and at least one memory storing instructions for the processor.

In an exemplary embodiment, wherein when executed, the instructions may cause the processor to identify at least one first subband occupied by a base station, among a plurality of subbands included in an unlicensed band, blind-decode, based on a CORESET configured over the plurality of subbands and the at least one first subband, at least one first PDCCH candidate among a plurality of PDCCH candidates configured in the CORESET, and receive the DCI based on the blind decoding.

In an exemplary embodiment, at least one first CCE occupied by the at least one first PDCCH candidate may be included in the at least one first subband.

In an exemplary embodiment, based on at least one second CCE being included in at least one second subband other than the at least one first subband among the plurality of subbands, among at least one second CCE occupied by a second PDCCH candidate among the plurality of PDCCH candidates, the second PDCCH candidate may not be blind-decoded.

In an exemplary embodiment, the at least one first subband may be identified based on: a predefined signal being received in the at least one first subband or information indicating the at least one first subband being included in the predetermined signal being received.

In an exemplary embodiment, each of the plurality of subbands may be related to a basic frequency unit of a channel access procedure (CAP) for the unlicensed band.

In an exemplary embodiment, the DCI may be received in at least one RB other than a predetermined number of RBs from at least one boundary of the at least one first subband, among a plurality of RBs included in the at least one first subband.

In an exemplary embodiment, the apparatus may communicate with at least one of a mobile terminal, a network, or an autonomous driving vehicle other than a vehicle including the apparatus.

According to various embodiments of the present disclosure, an apparatus for transmitting DCI in a wireless communication system may be provided.

In an exemplary embodiment, the apparatus may include a processor and at least one memory storing instructions for the processor, In an exemplary embodiment, when executed, the instructions may cause the processor to perform a CAP for occupying at least one first subband among a plurality of subbands included in an unlicensed band, and transmit, based on a CORESET configured over the plurality of subbands and the at least one first subband, the DCI in at least one first PDCCH candidate among a plurality of PDCCH candidates configured in the CORESET.

In an exemplary embodiment, at least one first CCE occupied by the at least one first PDCCH candidate may be included in the at least one first subband.

It will be appreciated by persons skilled in the art that the objects that could be achieved with the present disclosure are not limited to what has been particularly described hereinabove and the above and other objects that the present disclosure could achieve will be more clearly understood from the following detailed description.

Advantageous Effects

According to various embodiments of the present disclosure, a method and apparatus for transmitting and receiving downlink control information (DCI) in a wireless communication system may be provided.

Further, according to various embodiments of the present disclosure, a user equipment (UE) may be allowed to monitor only physical downlink control channel (PDCCH) candidates configured in a subband that the UE has determined to be idle according to a channel access procedure (CAP).

Therefore, according to various embodiments of the present disclosure, the UE may efficiently blind-decode a PDCCH in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the present disclosure, provide embodiments of the present disclosure together with detail explanation.

BEST MODE

Techniques described below may be used in various wireless access systems such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, and evolved UTRA (E-UTRA). UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation RAT for enhanced mobile broadband communication (eMBB), massive MTC (mMTC), and ultra-reliable and low latency communication (URLLC) is being discussed. For convenience, this technology is called NR or New RAT in the present disclosure.

The following description is given in the context of 3GPP NR, for clarity, which should not be construed as limiting various embodiments of the present disclosure.

1. Overview of 3GPP System 1.1. Physical Channels and General Signal Transmission In a wireless access system, a UE receives information from a base station (BS) on a downlink (DL) and transmits information to the BS on an uplink (UL). The information transmitted and received between the UE and the BS includes general data information and various types of control information. There are many physical channels according to the types/usages of information transmitted and received between the BS and the UE.

Figure 1:
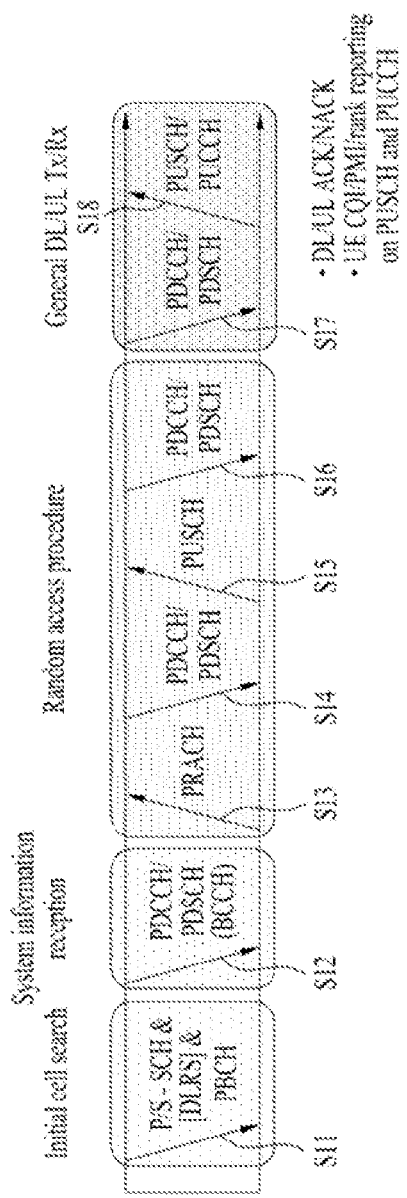
FIG. 1 is a diagram illustrating physical channels and a signal transmission method using the physical channels, which may be used in various embodiments of the present disclosure.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the BS and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the BS.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
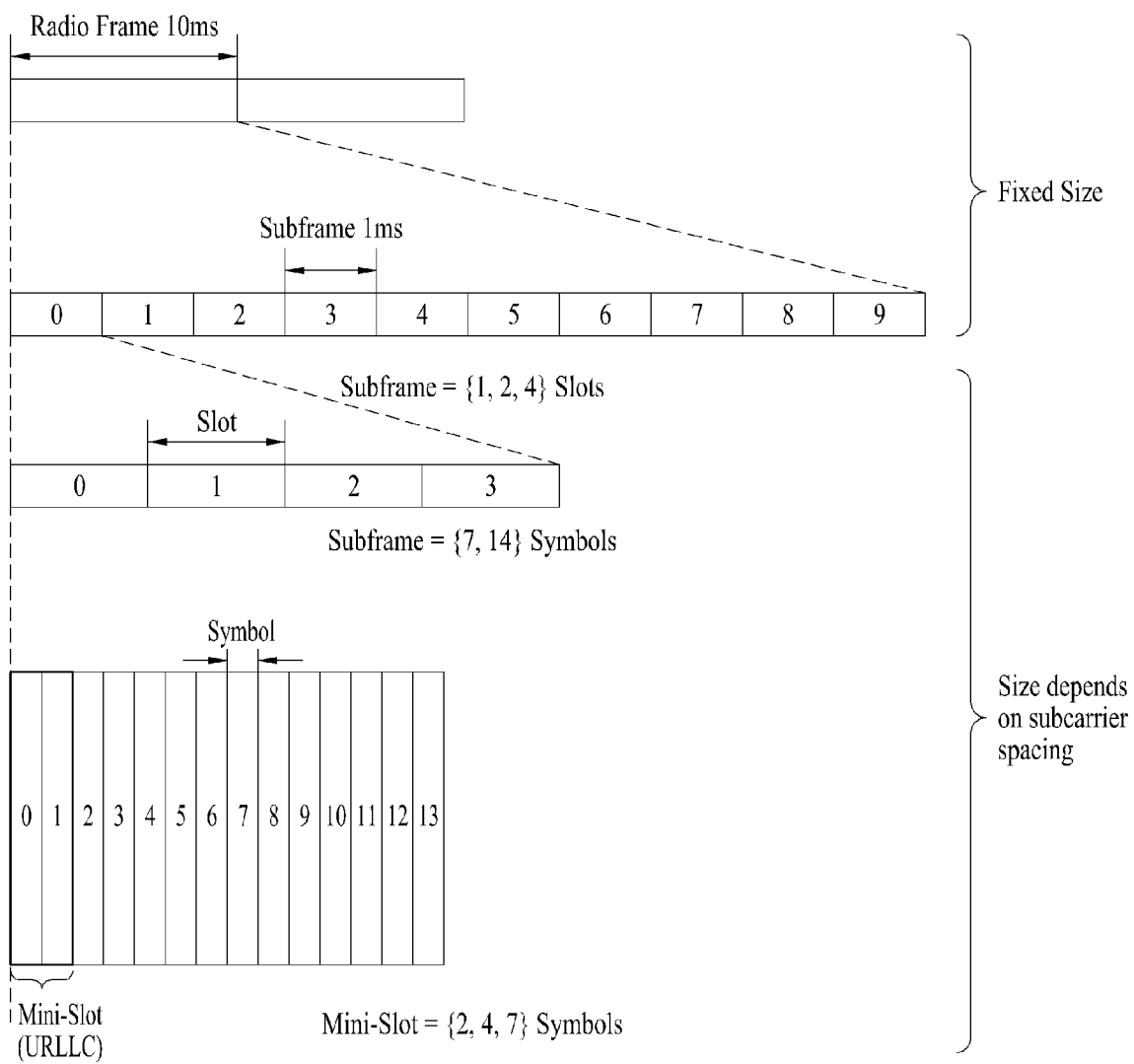
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or µ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 4. For a bandwidth part, µ and a CP are obtained from RRC parameters provided by the BS.

TABLE 4

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 5 below defines the NR frequency band, by way of example.

TABLE 2

| Frequency range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 6 lists the number of symbols per slot, the number of slots per frame, and the number of slots per subframe, for each SCS in a normal CP case, and Table 7 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
| --- | --- | --- | --- |
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 6 or Table 7.

Further, a mini-slot may include 2, 4 or 7 symbols, fewer symbols than 2, or more symbols than 7.

Figure 3:
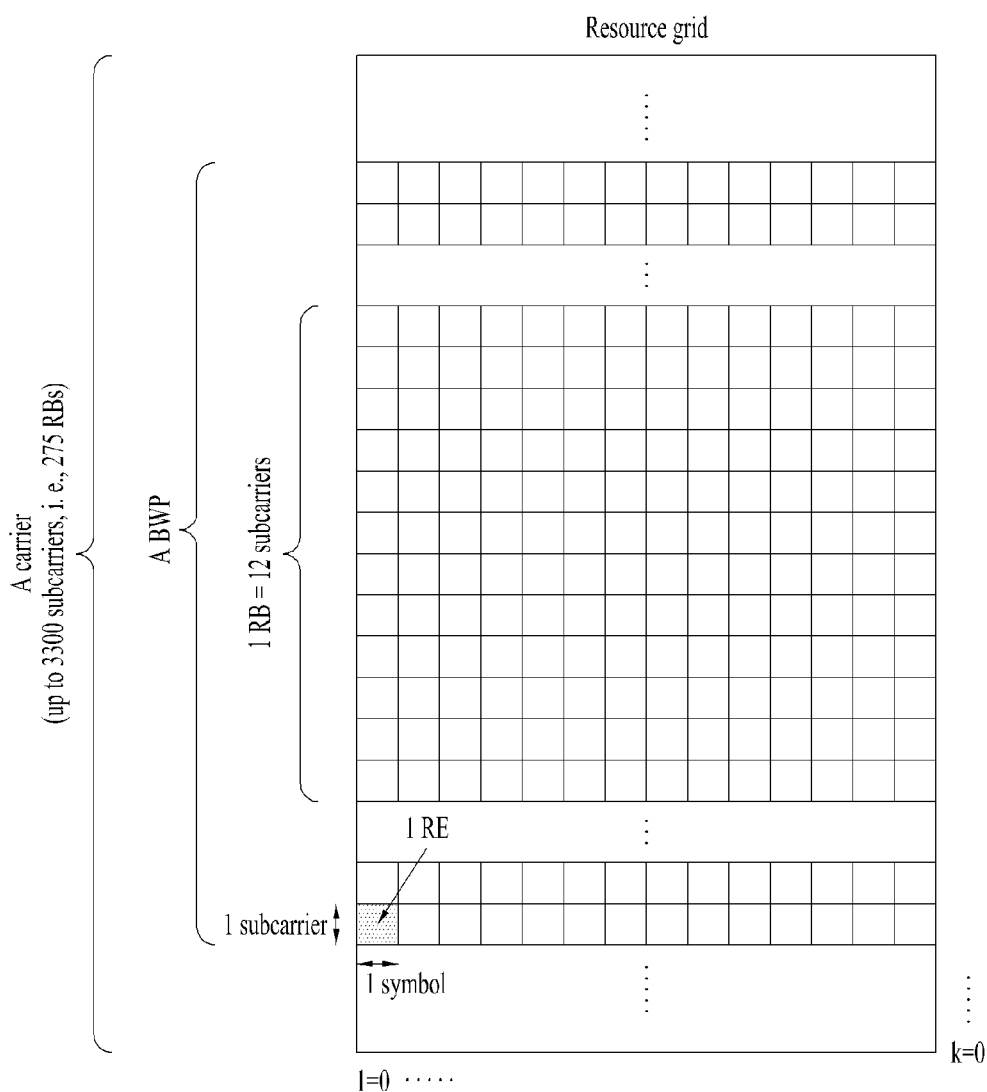
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
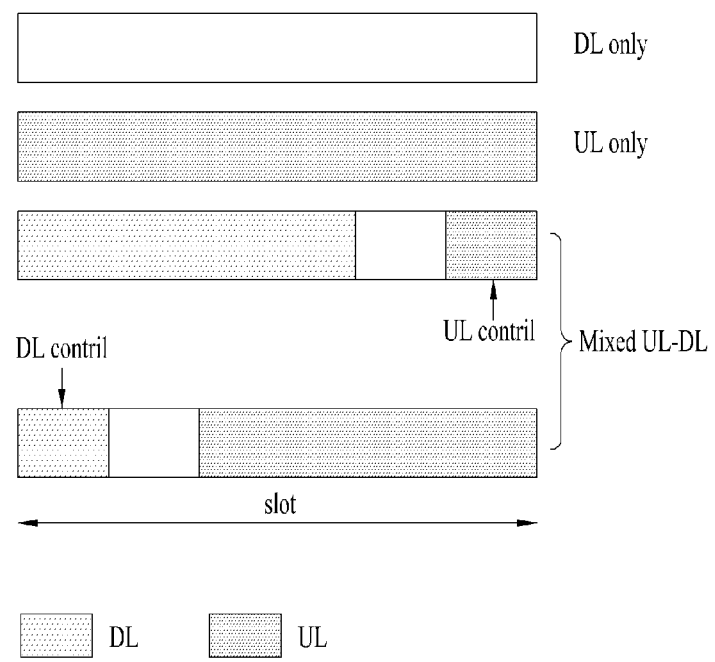
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) between the DL control region and the UL control region may be used for DL data transmission or UL data transmission. A time gap for DL-to-UL or UL-to-DL switching may exist between the control region and the data region. For example, the following configuration may be considered. The periods are listed in a temporal order.

Figure 5:
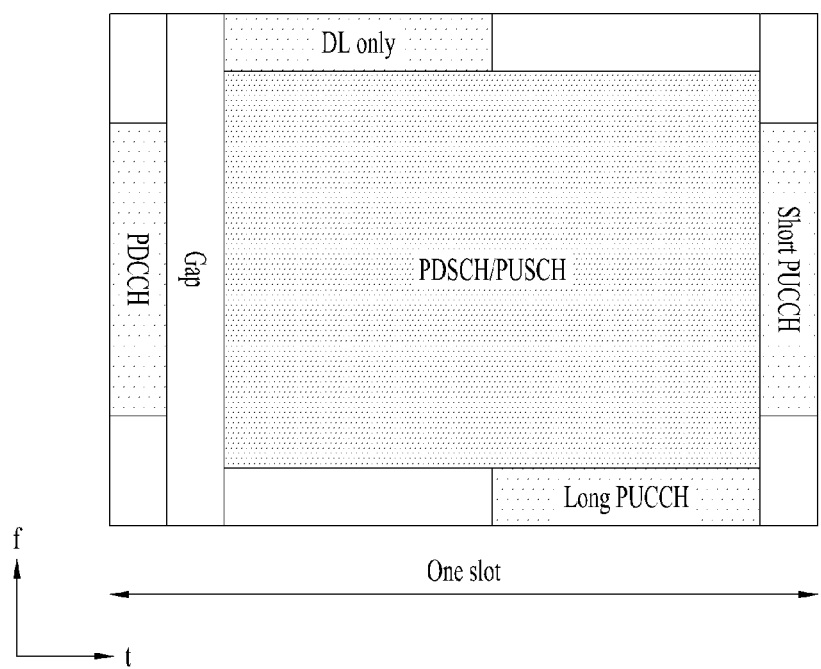
FIG. 5 is a diagram illustrating exemplary mapping of physical channels in a self-contained slot to which various embodiments of the present disclosure are applicable.

1. DL only configuration
 2. UL only configuration
 3. Mixed UL-DL configuration
  DL region+Guard period (GP)+UL control region
  DL control region+GP+UL region
  DL region: (i) DL data region, (ii) DL control region+DL data region
  UL region: (i) UL data region, (ii) UL data region+UL control region FIG. 5 is a diagram illustrating exemplary mapping of physical channels in a self-contained slot to which various embodiments of the present disclosure are applicable.

The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of switching from a transmission mode to a reception mode or from the reception mode to the transmission mode at the BS and the UE. Some symbols at the time of switching from DL to UL within a subframe may be configured as the GP.

Now, a detailed description will be given of physical channels.

The PDCCH delivers downlink control information (DCI). For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information about resource allocation of a higher-layer control message such as a random access response (RAR) transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The CCE includes six resource element groups (REGs). An REG is defined by one OFDM symbol and one (physical) resource block ((P)RB). The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher-layer signaling (e.g., radio resource control (RRC)-layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. The monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher-layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (in slots) and a PDCCH monitoring period offset (in slots).
monitoringSymbolsWithinSlot: this indicates PDCCH monitoring symbols in a slot (e.g., first symbol(s) in the CORESET).
nrofCandidates: this indicates the number of PDCCH candidates for each AL={1, 2, 4, 8, 16} (one of 0, 1, 2, 3, 4, 5, 6, and 8).
An occasion (e.g., time/frequency resource) for monitoring PDCCH candidates is defined as a PDCCH (monitoring) occasion. One or more PDCCH (monitoring) occasions may be configured in a slot.

Table 5 lists the characteristics of each SS.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTIm or MCS-C-RNTI, or CS-RNTI(s) | User specific PDSCH decoding |

Table 6 lists DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to UEs in a group on a group-common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a DL-SCH TB) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

Hybrid automatic repeat request (HARQ)-acknowledgment (ACK): a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

Channel state information (CSI): feedback information for a DL channel. Multiple input multiple output (MIMO)-related feedback information includes a rank indicator (RI) and a precoding matrix indicator (PMI).

Table 7 illustrates exemplary PUCCH formats. PUCCH formats may be divided into short PUCCHs (Formats 0 and 2) and long PUCCHs (Formats 1, 3, and 4) based on PUCCH transmission durations.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

2. Unlicensed Band System

Figure 6:
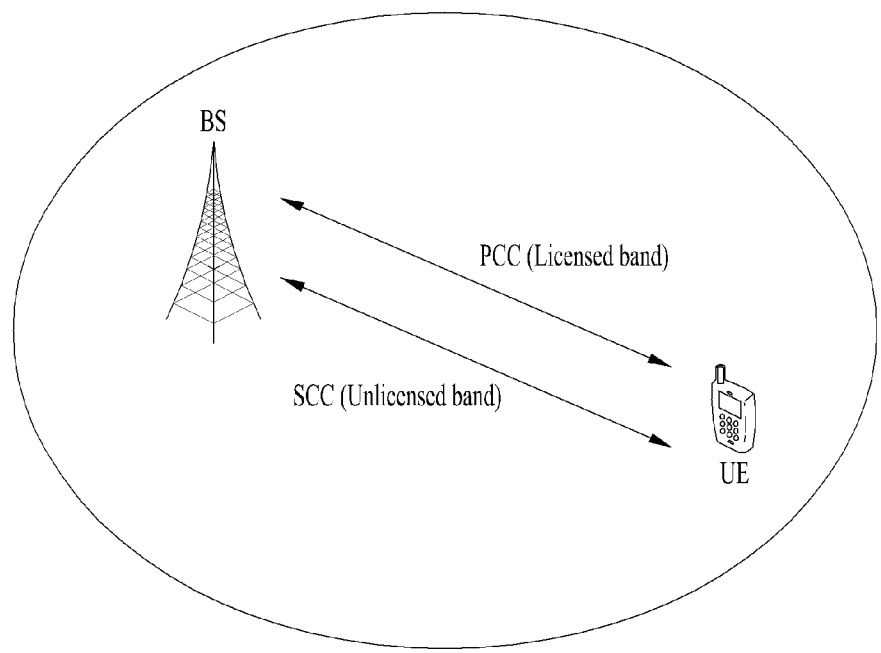
FIG. 6 is a diagram illustrating an exemplary wireless communication system supporting an unlicensed band, which is applicable to various embodiments of the present disclosure.
Figure 6:
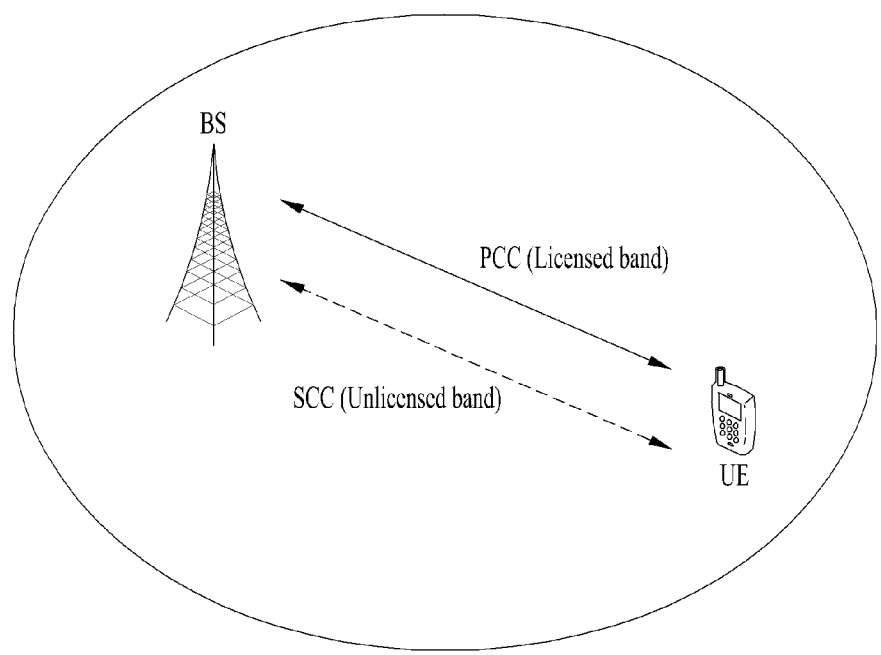

FIG. 6 is a diagram illustrating an exemplary wireless communication system supporting an unlicensed band, which is applicable to various embodiments of the present disclosure.

The 3GPP standardization organization has been working on standardization of a 5G wireless communication system known as New RAT (NR). The NR system seeks to support a plurality of logical networks in a single physical system. Therefore, the NR system is designed to support services having various requirements (e.g., eMBB, mMTC, and URLLC) by changing a transmission time interval (TTI) and an OFDM numerology (e.g., an OFDM symbol duration and an SCS). Along with the rapid growth of data traffic due to the recent emergence of smart devices, a method of using a U-band in cellular communication is also considered for the 3GPP NR system, similarly to licensed assisted access (LAA) in the legacy 3GPP LTE system. Unlike LAA, an NR cell of an unlicensed band (hereinafter, referred to as NR UCell) aims to support a stand-alone (SA) operation. For example, PUCCH, PUSCH, and PRACH transmissions may be supported in the NR UCell.

For convenience, a cell operating in a licensed band (L-band) is defined as an LCell, and a carrier of the LCell is defined as a (DL/UL) LCC. A cell operating in an unlicensed band (U-band) is defined as a UCell, and a carrier of the U-cell is defined as a (DL/UL) UCC. The carrier/carrier-frequency of a cell may refer to the operating frequency (e.g., center frequency) of the cell. A cell/carrier (e.g., CC) may be generically called a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 6(a) illustrates signal transmission and reception between a UE and a BS in an LCC and a UCC (non-stand-alone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 6(a) corresponds to LAA of a 3GPP LTE system. FIG. 6(b) illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system.

2.1. Method of Occupying Resources in Unlicensed Band

Figure 7:
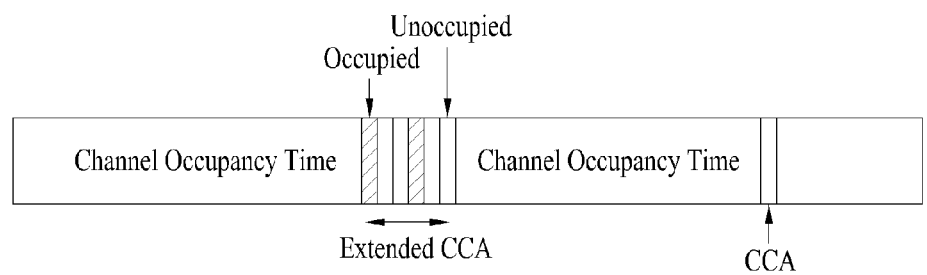
FIG. 7 is a diagram illustrating an exemplary method of occupying resources in an unlicensed band to which various embodiments of the present disclosure are applicable.

FIG. 7 is a diagram illustrating an exemplary method of occupying resources in an unlicensed band to which various embodiments of the present disclosure are applicable.

According to regional regulations on an unlicensed band, a communication node should determine whether other communication node(s) is using a channel in the unlicensed band, before signal transmission. Specifically, the communication node may determine whether other communication node(s) is using the channel by performing carrier sensing (CS) before the signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. When determining that the channel is idle, the communication node may start signal transmission in a UCell. For reference, the WiFi standard (e.g., 801.11ac) specifies a CCA threshold of −62 dBm for a non-WiFi signal and a CCA threshold of −82 dBm for a WiFi signal. The above-described series of operations may be referred to as a listen-before-talk (LBT) or channel access procedure (CAP). LBT and CAP may be interchangeably used.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, ..., 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects N{1, 2, ..., q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

2.2. Downlink Channel Access Procedure (DL CAP)

The BS may perform one of the following unlicensed band access procedures (e.g., CAPs) to transmit a DL signal in an unlicensed band.

2.2.1. First DL CAP Method

Figure 8:
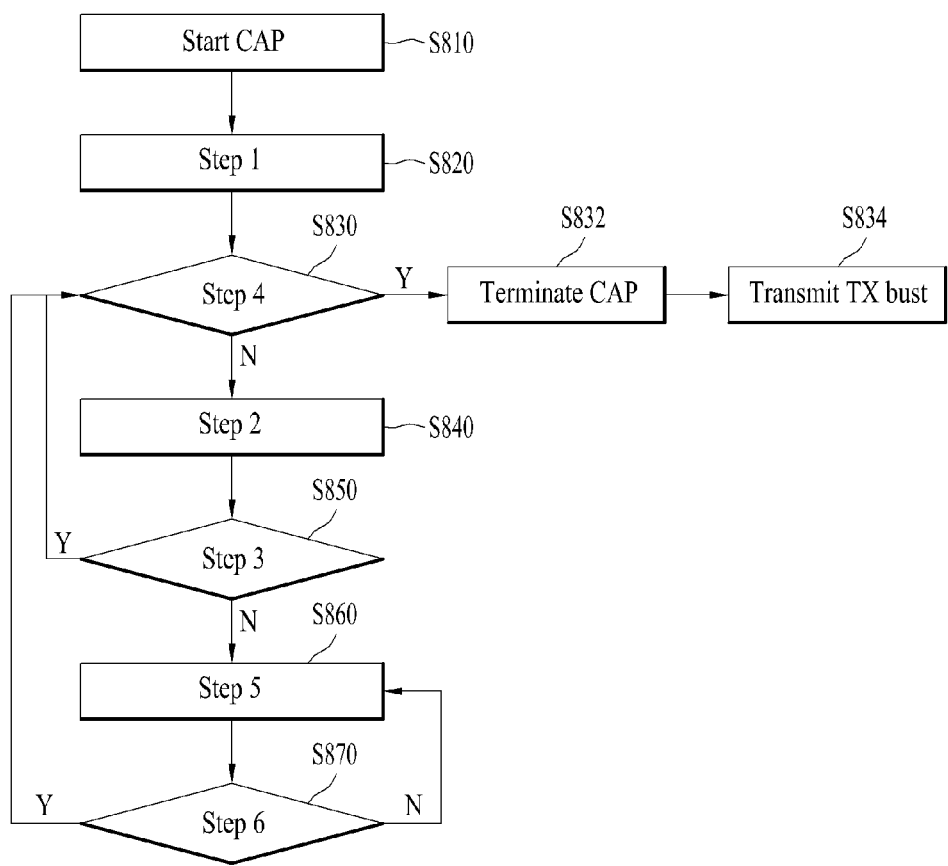
FIG. 8 is a flowchart illustrating a channel access procedure (CAP) for downlink (DL) signal transmission in an unlicensed band to which various embodiments of the present disclosure are applicable.

FIG. 8 is a flowchart illustrating a CAP for DL signal transmission in an unlicensed band to which various embodiments of the present disclosure are applicable.

For DL signal transmission (e.g., transmission of a DL signal such as a PDSCH/PDCCH/enhanced PDCCH (EPDCCH)) in the unlicensed band, the BS may initiate a CAP (S810). The BS may randomly select a backoff counter N within a contention window (CW) according to step 1. N is set to an initial value $N_{init}$ (S820). $N_{init}$ is a random value selected from the values between 0 and $CW_p$. Subsequently, when the backoff counter value N is 0 according to step 4 (Y in S830), the BS terminates the CAP (S832). The BS may then perform a transmission (Tx) burst transmission including a PDSCH/PDCCH/EPDCCH (S834). On the contrary, when the backoff counter value N is not 0 (N in S830), the BS decrements the backoff counter value by 1 according to step 2 (S840). Subsequently, the BS checks whether the channel of U-cell(s) is idle (S850). If the channel is idle (Y in S850), the BS determines whether the backoff counter value is 0 (S830). On the contrary, when the channel is not idle, that is, the channel is busy (N in S850), the BS determines whether the channel is idle during a longer defer duration $T_d$ (25 usec or longer) than a slot duration (e.g., 9 usec) according to step 5 (S860). If the channel is idle during the defer duration (Y in S870), the BS may resume the CAP. The defer duration may include a 16-usec duration and the immediately following $m_p$ consecutive slot durations (e.g., each being 9 usec). On the contrary, if the channel is busy during the defer duration (N in S870), the BS re-checks whether the channel of the U-cell(s) is idle during a new defer duration by performing step S860 again.

Table 8 illustrates that $m_p$, a minimum CW, a maximum CW, a maximum channel occupancy time (MCOT), and an allowed CW size applied to a CAP vary according to channel access priority classes.

TABLE 8

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference time unit (TU)) being determined as NACK. In the case where the BS performs a DL transmission including a PDSCH that is associated with a channel access priority class p on a carrier, if the probability Z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

2.2.2. Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than tins, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

2.2.3. Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

2.3. Uplink Channel Access Procedure (UL CAP)

The UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

2.3.1. Type 1 UL CAP Method

Figure 9:
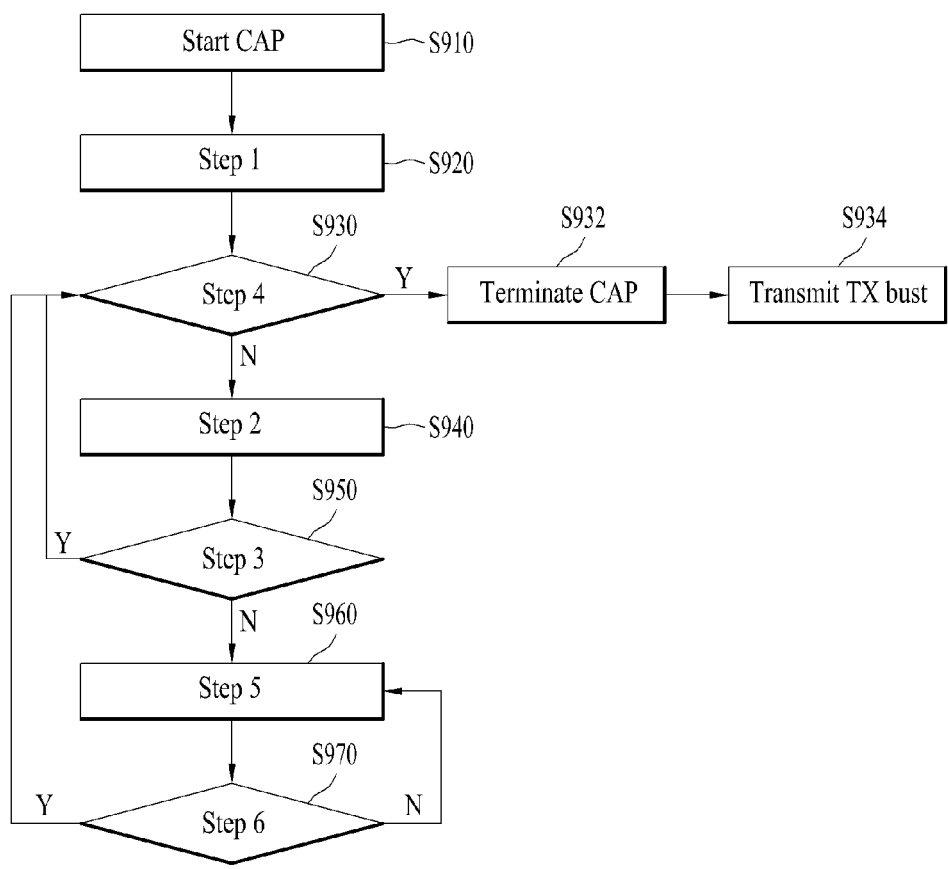
FIG. 9 is a flowchart illustrating a CAP for uplink (UL) signal transmission in an unlicensed band to which various embodiments of the present disclosure are applicable.

FIG. 9 is a flowchart illustrating a CAP for UL signal transmission in an unlicensed band to which various embodiments of the present disclosure are applicable.

For a signal transmission in an unlicensed band, the UE may initiate the CAP (S910). The UE may randomly select a backoff counter N within a CW according to step 1. N is set to an initial value $N_{init}$ (S920). $N_{init}$ is a value selected randomly from among the values between 0 and $CW_p$. Subsequently, if the backoff counter value N is 0 according to step 4 (Y in S930), the UE ends the CAP (S932). Subsequently, the UE may perform a Tx burst transmission (S934). On the other hand, if the backoff counter value is not 0 (N in S930), the UE decrements the backoff counter value by 1 according to step 2 (S940). Subsequently, the UE checks whether a channel of U-cell(s) is idle (S950). If the channel is idle (Y in S950), the UE checks whether the backoff counter value is 0 (S930). On the contrary, if the channel is not idle in step S950, that is, the channel is busy (N in S950), the UE checks whether the channel is idle for a defer duration $T_d$ (25 usec or more) longer than a slot time (e.g., 9 usec) according to step 5 (S960). If the channel is idle for the defer duration (Y in S970), the UE may resume the CAP. The defer duration may span a period of 16 usec and the following $m_p$ consecutive slot durations (e.g., 9 usec). On the other hand, if the channel is busy for the defer duration (N in S970), the UE re-performs S960 to check again whether the channel is idle for a new defer duration.

Table 9 illustrates that $m_p$, a minimum CW, a maximum CW, an MCOT, and an allowed CW size for a CAP vary according to a channel access priority class.

TABLE 9

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter 'absenceOfAnyOtherTechnology-r14' indicates TRUE, otherwise. $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 μs. The maximum duration before including any such gap shall be 6 ms..

A CW size applied to the Type 1 UL CAP may be determined in various ways. For example, the CW size may be adjusted based on whether a new data indicator (NDI) value for at least one HARQ process related to the HARQ process ID, HARQ_ID_ref of a UL-SCH within a predetermined time period (e.g., a reference TU) is toggled. In the case where the UE performs a signal transmission on a carrier by using a Type 1 CAP related to a channel access priority class p, when an NDI value for at least one HARQ process related to HARQ_ID_ref is toggled, the UE sets $CW_p=CW_{min,p}$ for all priority classes p∈{1,2,3,4}. Otherwise, the UE increments $CW_p$ for all priority classes p∈{1, 2,3,4} to the next higher allowed value.

2.3.2. Type 2 UL CAP Method

When the UE uses the Type 2 CAP for a UL signal transmission (e.g., transmission of a signal including a PUSCH) in an unlicensed band, the UE may transmit the UL signal (e.g., the signal including a PUSCH) in the unlicensed band immediately after the UE sense that a channel is idle at least for a sensing interval $T_{short\_ul}$=25 us. $T_{short\_ul}$ includes a duration of $T_f$ (=16 us) immediately followed by one slot duration $T_{sl}$=9 us. $T_f$ includes an idle slot duration $T_{sl}$ at the start of $T_f$.

3. Various Embodiments of the Present Disclosure

Various embodiments of the present disclosure will be described in more detail based on the above technical idea. The afore-described clauses 1 and 2 may be applied to the following embodiments of the present disclosure described. For example, operations, functions, terms, and so on which are not defined in the following embodiments of the present disclosure may be performed and described based on clauses 1 and 2.

As more and more communication devices require larger communication capacities, efficient use of a limited frequency band becomes a significant requirement. In this context, techniques of using an unlicensed band (U-band) in traffic offloading, such as 2.4 GHz mainly used in the legacy WiFi system or 5 GHz and/or 60 GHz which has newly attracted attention, are under consideration for a cellular communication system such as 3GPP LTE/NR.

To transmit a signal in an unlicensed band, a UE or a BS performs wireless transmission and reception based on contention between communication nodes. That is, when each communication node is to transmit a signal in the unlicensed band, the communication node may identify that another communication node is not transmitting a signal in the unlicensed band by performing channel sensing before the signal transmission. For convenience, this operation is defined as listen-before-talk (LBT) or a CAP. Particularly, the operation of checking whether another communication node is transmitting a signal is defined as carrier sensing (CS), and determining that another communication node is not transmitting a signal is defined as confirming clear channel assessment (CCA).

In an LTE/NR system to which various embodiments of the present disclosure are applicable, an eNB/gNB or a UE may also have to perform an LBT operation or a CAP for signal transmission in an unlicensed band. In other words, the eNB/gNB or the UE may transmit a signal in the unlicensed band, using or based on the CAP.

Further, when the eNB/gNB or the UE transmits a signal in the unlicensed band, other communication nodes should perform a CAP not to interfere with the eNB/gNB or the UE. For example, the WiFi standard (e.g., 801.11ac) specifies a CCA threshold as −62 dBm for a non-WiFi signal and as −82 dBm for a WiFi signal. Accordingly, when receiving a non-WiFi signal at or above −62 dBm, a station (STA) or an access point (AP) operating in conformance to the WiFi standard may not transmit a signal to prevent interference.

Figure 10:
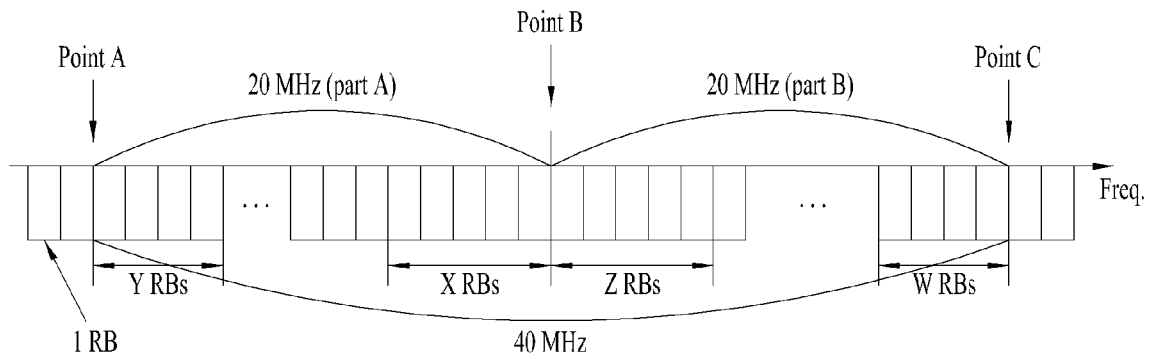
FIG. 10 is a diagram illustrating an example of an operating bandwidth and a CAP subband structure according to various embodiments of the present disclosure.

FIG. 10 is a diagram illustrating an example of an operating bandwidth and a CAP subband structure according to various embodiments of the present disclosure.

Various embodiments of the present disclosure may relate to a transmission and reception method of a device and a method of indicating a transmission frequency area to the device, when the device, which operates in a wideband larger than a CAP frequency unit in an unlicensed band, succeeds in a CAP only for some subband of the wideband and transmits a signal only in the subband.

In an NR system operating in an unlicensed band, a CAP may be performed in a unit smaller than an operating bandwidth (e.g., a bandwidth of a carrier or a bandwidth of a BWP). In the description of various embodiments of the present disclosure, a frequency unit in which a CAP is performed is defined as a CAP subband, for convenience.

For example, the size of a CAP subband may be 20 MHz.

For example, referring to FIG. 10, an operating bandwidth (BW) may be 40 MHz, and the BW of a CAP subband may be 20 MHz. For example, if the BS or the UE succeeds in a CAP only for 20 MHz (part A), the BS or the UE may be allowed to transmit a signal only in 20 MHz (part A) without any transmission in 20 MHz (part B). A transmission/reception method may be designed separately for "some RBs among RBs belonging to 20 MHz (part A)", for the purpose of reducing the effects on the performance of an analog and/or digital filter of a transmitting and/or receiving end or interference with other nodes that may be transmitting and receiving in 20 MHz (part B).

In an exemplary embodiment, "some RBs among RBs belonging to 20 MHz (part A)" may be X RBs (e.g., X=5) near to point B at the boundary between 20 MHz (part A) and 20 MHz (part B) illustrated in FIG. 10. Alternatively, in an exemplary embodiment, "some RBs among RBs belonging to 20 MHz (part A)" may be Y RBs near to point A at the opposite boundary to point B illustrated in FIG. 10. In an exemplary embodiment, "some RBs among RBs belonging to 20 MHz (part A)" may be referred to as a guard band or an intra-carrier guard band.

According to various embodiments of the present disclosure, a method of transmitting and receiving some RBs at a BW boundary (the above-described guard band, for example, X RBs near to point B) may be provided if a signal is transmitted only in a BW smaller than an operating BW (i.e., in an integer multiple BW of a CAP subband) due to a CAP performed in the CAP subband smaller than the operating BW.

While various embodiments of the present disclosure are described in the context of X RBs near to point B by way of example, they are also easily applicable to Y RBs near to point A and/or Y or W RBs near to point A or C for a 40-MHz transmission.

Various embodiments of the present disclosure may relate to a DL control and/or data channel transmission/reception method in consideration of transmission of a signal only in a BW smaller than an operating BW (i.e. a BW being an integer multiple of a CAP subband) due to a CAP for the CAP subband smaller than the operating BW.

According to various embodiments of the present disclosure, transmitting a signal in an unlicensed band by performing a CAP may mean starting the signal transmission in the unlicensed band by using the CAP.

According to various embodiments of the present disclosure, when it is said that a CAP is successful/failed, this may mean that when a BS and/or a UE is to start a DL and/or UL signal in an unlicensed band by using a CAP, the BS and/or the UE is capable of/not capable of starting to transmit the DL signal and/or UL signal at a predetermined time in the unlicensed band.

In an exemplary embodiment, referring to FIG. 10, the value of X, Y, Z and/or W may be set implicitly according to a mode. According to various embodiments of the present disclosure, a method of determining X, Y, Z and/or W by a UE may be provided.

For example, single wideband carrier operations are under discussion for an NR-U system. At least, the following modes may be applied to a DL wideband carrier operation.

Mode 1

A mode in which a single wideband carrier operation is possible, when a CAP is successful for all CAP subbands. A guard band may or may not be configured between CAP subbands.

Mode 2

A mode in which a single wideband carrier operation is possible, when a CAP is successful for a subset of CAP subbands and the CAP subbands are consecutive. A PRB in a guard band between two consecutive CAP subbands may not be scheduled.

Mode 3

A mode in which a single wideband carrier operation is possible, when a CAP is successful for a subset of CAP subbands and the CAP bands are non-consecutive. A PRB in a guard band between two consecutive CAP subbands may not be scheduled.

As described above, a PRB in a guard band between two consecutive CAP subbands may not be scheduled in Mode 2 and/or Mode 3. However, the PRB in the guard band may be scheduled a predetermined time (e.g., a filter adaptation time) after the CAP is successful.

In consideration of coexistence with the WiFi system in which a CAP is performed in units of 20 MHz, the BW of a carrier is basically limited to 20 MHz in the LTE LAA system. In the NR system, however, the carrier BW may vary with SCSs, and may be greater than 20 MHz. Further, the UE may be configured with a BWP smaller than a carrier BW operated by the BS in the NR system. The same thing may apply to the NR-U system. The carrier BW may be set to a multiple of 20 MHz in the NR-U system, in consideration of the CAP frequency unit of the WiFi system.

Accordingly, those skilled in the art will clearly understand that 20 MHz is meaningful as a CAP frequency unit in the following various embodiments of the present disclosure, not limiting the embodiments.

Each of the above operations according to various embodiments of the present disclosure will be described in detail. It will be clearly understood to those skilled in the art that various embodiments of the present disclosure described below may be combined fully or partially to constitute other various embodiments of the present disclosure, unless contradicting each other.

3.1. Method of Transmitting and Receiving X RB(s) Near to Point B 3.1.1. [Method #1] Method of Signaling Whether X RB(s) is Transmitted, in Case of PDSCH FIG. 11 is a flowchart illustrating an operation of a UE according to various embodiments of the present disclosure.

Figure 11:
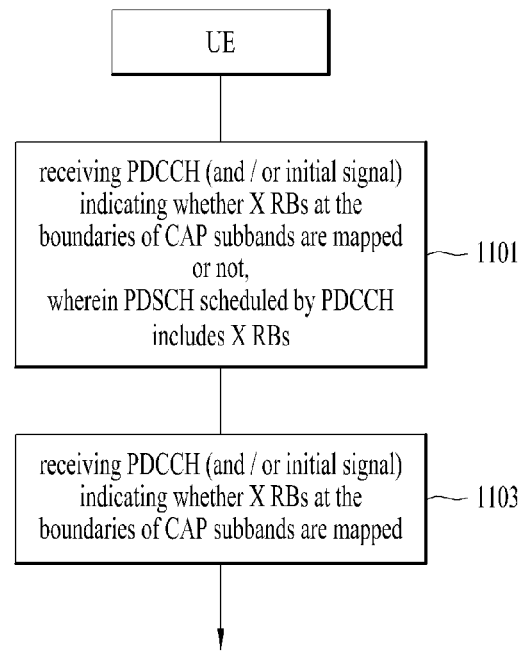
FIG. 11 is a flowchart illustrating an operation of a user equipment (UE) according to various embodiments of the present disclosure.

Referring to FIG. 11, in an exemplary embodiment, the UE may receive information indicating whether specific RBs at a boundary of 20 MHz used for a scheduled PDSCH are transmitted, on a PDCCH and/or in an initial signal in operation 1101.

In an exemplary embodiment, when the UE receives information indicating that the PDSCH is not mapped to the specific RBs at the boundary of the 20 MHz, the UE may flush PDSCH information decoded in the RBs (or code block (CB)/code block group (CBG)/transport block (TB) including the area of the RBs) from a reception buffer in operation 1103.

Now, a detailed description will be given of each of the operations of various embodiments of the present disclosure according to [Method #1]. It will be clearly understood to those skilled in the art that various embodiments of the present disclosure described below may be combined fully or partially to constitute other various embodiments of the present disclosure, unless contradicting each other.

3.1.1.1a. [Method #1-1a] BS Operation

According to various embodiments of the present disclosure, the BS may explicitly signal to the UE whether X RB(s) is transmitted, by common DCI, UE-group common DCI, or UE-specific DCI.

In an exemplary embodiment, the common DCI, the UE-group common DCI, or the UE-specific DCI may be transmitted in a licensed band or an unlicensed band.

For example, referring to FIG. 10, it is assumed that the BS transmits only 20 MHz (part A) does not transmit X RBs in slot #n. In an exemplary embodiment, the BS may indicate this transmission to the UE by common DCI, UE-group common DCI, or UE-specific DCI in slot #(n+k). For example, if the PDSCH is transmitted only in 20 MHz (part A), not in the X RBs in slot #n, the BS may indicate to the UE that the PDSCH is not transmitted in the X RBs by common DCI, UE-group common DCI, or UE-specific DCI in slot #(n+k).

In an exemplary embodiment, k may be predefined or configured by RRC signaling. For example, k=3.

Alternatively, for example, it is assumed that the BS transmits a PDSCH corresponding to HARQ ID #0 to UE1 in slot #n. In an exemplary embodiment, when X RBs are included in a scheduled RB area but are not actually transmitted (that is, when the PDSCH is not transmitted in the X RBs), the BS may signal to the UE that no transmission has been performed in the X RBs (i.e., the PDSCH has not been transmitted in the X RBs) by retransmission DCI for HARQ ID #0.

Alternatively, in an exemplary embodiment, when the X RBs are included in the scheduled RB area and transmitted actually (that is, when the PDSCH is transmitted in the X RBs), the BS may signal to the UE that a transmission has been performed in the X RBs (i.e., the PDSCH has been transmitted in the X RBs) by the retransmission DCI for HARQ ID #0.

3.1.1.1b. [Method #1-1b] UE Operation (Corresponding to BS Operation in Method #1-1a)

According to various embodiments of the present disclosure, it may be explicitly signaled to the UE whether X RB(s) is transmitted, by common DCI, UE-group common DCI, or UE-specific DCI.

In an exemplary embodiment, the common DCI, the UE-group common DCI, or the UE-specific DCI may be received in a licensed band or an unlicensed band.

For example, referring to FIG. 10, the UE may expect to receive signaling indicating whether X RB(s) has been transmitted in slot #n by common DCI, UE-group common DCI, or UE-specific DCI in slot #(n+k). For example, the UE may expect to receive signaling indicating whether a PDSCH has been received in the X RB(s) in slot #n by common DCI, UE-group common DCI, or UE-specific DCI in slot #(n+k).

In an exemplary embodiment, k may be predefined or configured by RRC signaling. For example, k=3.

In an exemplary embodiment, it is assumed that the UE receives signaling indicating that no transmission is performed in the X RB(s) in slot #n. In this case, the UE may flush PDSCH information decoded in the X RB(s)(or a CB and/or a CBG and/or a TB, which includes the area of the X RB(s)) from the reception buffer. For example, the UE may empty the PDSCH information decoded in the X RBs from the reception buffer.

Alternatively, for example, it is assumed that a PDSCH corresponding to HARQ ID #0 in slot #n is scheduled for the UE, and X RBs are included in a scheduled RB area. In an exemplary embodiment, the UE may receive signaling indicating whether a transmission is performed in X RBs in slot #n (that is, whether the PDSCH is transmitted in the X RBs) by retransmission DCI for HARQ ID #0 from the BS.

In an exemplary embodiment, when the UE receives signaling indicating that no transmission has been performed in X RBs, the UE may flush PDSCH information decoded in the X RBs (or a CB/CBG/TB including this area) from the reception buffer. For example, the UE may empty the PDSCH information decoded in the X RBs from the reception buffer.

3.1.1.2a. [Method #1-2a] BS Operation

According to various embodiments of the present disclosure, an initial signal may be a kind of signal included in a DL transmission in order to identify a DL transmission of at least a serving cell.

In an exemplary embodiment, the initial signal may be transmitted not only at the beginning of a DL burst, but also in the middle of the DL burst.

In an exemplary embodiment, the initial signal may be a signal and/or a channel of the NR system or a partial modification of the signal and/or the channel.

In an exemplary embodiment, the initial signal may be a signal transmitted/received in a wideband, indicating a band (e.g., subband) in which a signal is actually transmitted/received in the wideband.

According to various embodiments of the present disclosure, the BS may transmit the initial signal only in an actual transmission BW, or may indicate the actual transmission BW to the UE by common DCI or UE-specific DCI.

In an exemplary embodiment, the actual transmission BW may be an integer multiple of the BW of a CAP subband.

In an exemplary embodiment, a maximum number of actual transmission RBs may be preconfigured for each BW being an integer multiple of the BW of the CAP subband.

For example, referring to FIG. 10, it may be preconfigured that Y RBs at point A are not transmitted and X RBs at point B are transmitted, during a 40-MHz transmission. For example, in the case of a transmission in 20 MHz (part A), it may be preconfigured that neither Y RBs at point A nor X RBs at point B are transmitted.

In this example, when the BS indicates to the UE later that only 20 MHz (part A) is transmitted by the initial signal or DCI, this may mean that neither of Y RBs at point A and X RBs at point B are transmitted.

Referring to FIG. 10, for an actual transmission BW being an integer multiple of the BW of the CAP subband, it may be preconfigured whether a PDSCH is transmitted in the X, Y, Z and/or W RBs at point A, B and/or C, and when the BS indicates the actual transmission BW to the UE by the initial signal or DCI, the UE may determine based on the preconfiguration for the actual transmission BW, indicated by the BS, whether the PDSCH is transmitted in the X, Y, Z and/or W RBs at point A, B and/or C, in an exemplary embodiment.

3.1.1.2b. [Method #1-2b] UE Operation (Corresponding to BS Operation in Method #1-2a)

According to various embodiments of the present disclosure, the UE may identify an actual transmission BW of the BS by blind detection (BD or blind decoding) of an initial signal. Alternatively, according to various embodiments of the present disclosure, the UE may receive information about the actual transmission BW of the BS in common DCI or UE-specific DCI.

In an exemplary embodiment, the actual transmission BW may be an integer multiple of the BW of a CAP subband.

In an exemplary embodiment, a maximum number of actual transmission RBs may be preconfigured for each BW being an integer multiple of the BW of the CAP subband.

For example, referring to FIG. 10, it may be preconfigured that the Y RBs at point A are not transmitted and the X RBs at point B are transmitted, during a 40-MHz transmission. For example, in the case of a transmission in 20 MHz (part A), it may be preconfigured that neither the Y RBs at point A nor the X RBs at point B are transmitted.

In this example, upon receipt of information indicating that only 20 MHz (part A) has been transmitted in an initial signal or DCI, the UE may flush PDSCH information decoded in the X RBs (or a CB/CBG/TB including the area of the X RBs) from the reception buffer. For example, the UE may empty the PDSCH information decoded in the X RBs from the reception buffer.

Alternatively, in an exemplary embodiment, even when the UE performs blind detection on the initial signal at the beginning, the UE may perform the blind detection by using the maximum number of actual transmission RBs for each BW being a preconfigured integer multiple of the BW of the CAP subband.

For example, when the UE performs blind detection on the initial signal transmitted in 40 MHz, the UE may assume that the initial signal is not transmitted in the Y RBs at point A. Alternatively, when the UE performs blind detection on the initial signal transmitted in 20 MHz (part A), the UE may assume that the initial signal is not transmitted in either of the Y RBs at point A or the X RBs at point B.

3.1.2. [Method #2] Signaling Method for X RB(s) in Case of PUSCH and/or PUCCH

Figure 12:
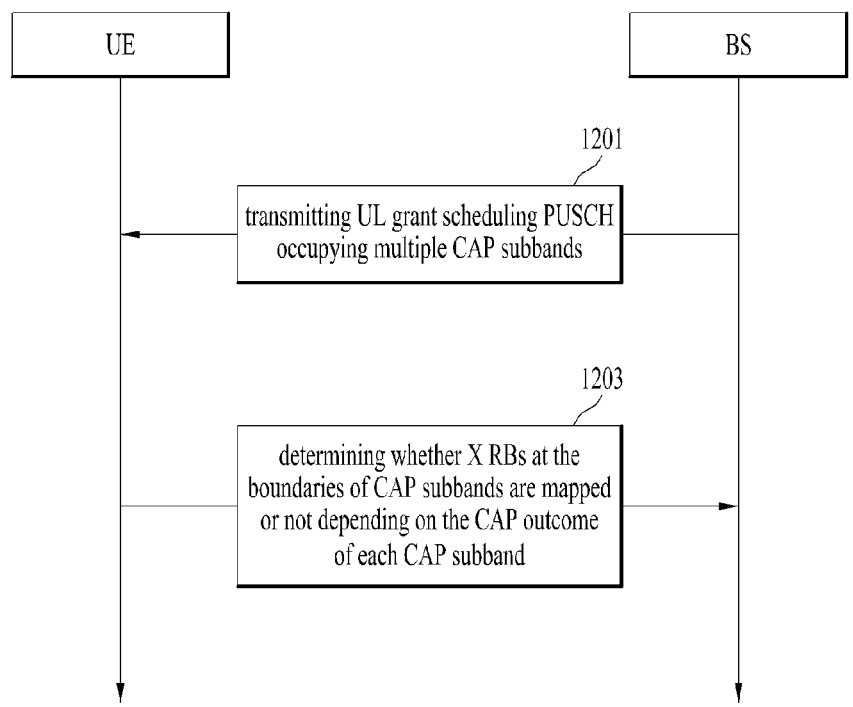
FIG. 12 is a diagram illustrating a signal flow for operations of a UE and a base station (BS) according to various embodiments of the present disclosure.

FIG. 12 is a diagram illustrating a signal flow for operations of a UE and a BS according to various embodiments of the present disclosure.

Referring to FIG. 12, according to an exemplary embodiment, the BS may transmit, to the UE, a UL grant for scheduling a PUSCH occupying one or more CAP subbands in operation 2201.

According to an exemplary embodiment, the UE may perform a CAP for the one or more CAP subbands in operation 2203. In an exemplary embodiment, the UE may transmit the PUSCH only in a resource area corresponding to a CAP subband in which the UE has succeeded in the CAP, and thus determine whether to transmit the PUSCH in RBs at a boundary of 20 MHz (whether to transmit the PUSCH in the 20 MHz boundary RBs).

Each of the above operations in [method #2] according to various embodiments of the present disclosure will be described in detail. It will be clearly understood to those skilled in the art that various embodiments of the present disclosure described below may be combined fully or partially to constitute other various embodiments of the present disclosure, unless contradicting each other.

3.1.2.1a. [Method #2-1a] UE Operation

According to various embodiments of the present disclosure, the UE may transmit a demodulation reference signal (DM-RS) only in an actual transmission BW.

Alternatively, according to various embodiments of the present disclosure, the UE may signal an actual transmission BW by a PUSCH and/or a PUCCH.

In the case of a PUSCH, for example, the UE may map the corresponding information to separate REs after encoding the information separately from a UL-SCH, in a similar manner to piggyback of UCI (e.g., HARQ-ACK/SR).

For example, in the case of a PUCCH, the UE may separately encode the corresponding information or jointly encode the information with other UCI, and then map the encoded information to REs.

In an exemplary embodiment, the actual transmission BW may be an integer multiple of the BW of a CAP subband.

In an exemplary embodiment, an available RB area for transmission may be preconfigured for each BW being an integer multiple of the BW of the CAP subband.

For example, referring to FIG. 10, it may be preconfigured that when a CAP is successful for the entire 40 MHz, the Y RBs at point A are not transmitted, and the X RBs at point B are transmitted. For example, when a CAP is successful for 20 MHz (part A), it may be preconfigured that neither the Y RBs at point A nor the X RBs at point B are transmitted.

In this example, when the UE indicates a transmission only in 20 MHz (part A) to the BS by some REs of the PUSCH or the PUCCH, this may mean that neither the Y RBs at point A nor the X RBs at point B are transmitted.

Alternatively in an exemplary embodiment, even though a PUSCH and/or PUCCH including the X RBs at point B is scheduled for the UE, when the UE fails in a CAP for 20

MHz (part B) and thus transmits only in 20 MHz (part A), a DM-RS and UL data may not be transmitted in the X RBs at point B.

Alternatively, in an exemplary embodiment, information piggybacked to the PUSCH or information loaded on the PUCCH may directly indicate whether the X RBs at point B are transmitted.

According to various embodiments of the present disclosure, the UE may explicitly indicate an actual transmission BW to the BS by the DM-RS.

For example, when the DM-RS is a gold sequence, the UE may transmit the DM-RS by applying a (configured) separate scrambling seed and/or orthogonal cover code (OCC) and/or comb index and/or port index according to a transmission BW combination.

Alternatively, for example, when the DM-RS is a constant amplitude zero autocorrelation waveform (CAZAC) sequence or Zadoff-Chu sequence, the UE may transmit the DM-RS by applying a (configured) separate root index and/or cyclic index and/or port index according to a transmission BW combination.

3.1.2.1b. [Method #2-1b] BS Operation (Corresponding to UE Operation in Method #2-1a)

According to various embodiments of the present disclosure, the BS may identify a transmission BW including an actual transmission RB area of the UE from among RBs of a scheduled PUSCH and/or PUCCH by blind detection of a DM-RS.

Alternatively, according to various embodiments of the present disclosure, the BS may receive information about the transmission BW including the actual transmission RB area of the UE in information piggybacked to a PUSCH or information loaded on a PUCCH.

In an exemplary embodiment, the actual transmission BW may be an integer multiple of the BW of a CAP subband.

In an exemplary embodiment, an available RB area for transmission may be preconfigured for each BW being an integer multiple of the BW of the CAP subband.

For example, referring to FIG. 10, when a CAP is successful for the entire 40 MHz, it may be configured that the Y RBs at point A are not transmitted and the X RBs of point B are transmitted. For example, when a CAP is successful for 20 MHz (part A), it may be preconfigured that neither the Y RBs at point A nor the X RBs at point B are transmitted.

In this example, upon receipt of information indicating that only 20 MHz (part A) has been transmitted in the information piggybacked to the PUSCH, the BS may flush PUSCH information decoded in the corresponding RBs (or a CB/CBG/TB including the area of the X RBs) from a reception buffer. For example, the BS may empty the PUSCH information decoded in the X RBs from the reception buffer.

According to various embodiments of the present disclosure, the BS may identify/determine the transmission BW of the PUSCH/PUCCH depending on the sequence of the DM-RS received according to an actual transmission BW combination during DM-RS blind detection.

For example, when the DM-RS is a gold sequence, a (configured) separate scrambling seed and/or orthogonal cover code (OCC) and/or comb index and/or port index may be set according to a transmission BW combination.

Alternatively, when the DM-RS is a CAZAC sequence or a Zadoff-Chu sequence, a (configured) separate root index and/or cyclic index and/or port index may be set according to a transmission BW combination.

3.1.3. [Method #3] Signaling Method for X RB(s) in PRACH and/or SRS Transmission According to various embodiments of the present disclosure, the UE may transmit a PRACH and/or an SRS only in an actual transmission BW.

In an exemplary embodiment, the actual transmission BW may be an integer multiple of the BW of a CAP subband.

In an exemplary embodiment, an available RB area for transmission may be preconfigured for each BW being an integer multiple of the BW of the CAP subband.

For example, referring to FIG. 10, it may be preconfigured that when a CAP is successful for the entire 40 MHz, the Y RBs at point A are not transmitted, and the X RBs at point B are transmitted. For example, when a CAP is successful for 20 MHz (part A), it may be preconfigured that neither the Y RBs at point A nor the X RBs at point B are transmitted.

In this example, whether to transmit the PRACH/SRS in the X/Y RBs may be determined according to a transmission BW determined based on a CAP result. For example, when the CAP is successful only for 20 MHz (part A), the PRACH/SRS signal may not be transmitted in either of the Y RBs at point A or the X RBs at point B.

3.1.4. [Method #4] Method of Mapping Data to X RBs

A method of mapping data to X RBs according to various embodiments of the present disclosure may be generally applied to transmission in 40 MHz, or even to transmission only in 20 MHz (part A) due to success of a CAP only in 20 MHz (part A) in the example of FIG. 10. That is, the method of mapping data to X RBs according to various embodiments of the present disclosure may be applied to both a case in which a CAP is successful for some of (scheduled) subbands and a case in which a CAP is successful for all subbands. For example, even when a PDSCH is scheduled only in 20 MHz (part A) (and a CAP is successful in 20 MHz (part A)), the PDSCH may be mapped to RBs excluding the X RBs among RBs in 20 MHz (part A).

The method of mapping data to X RBs according to various embodiments of the present disclosure may be commonly applied to UL data as well as DL data.

[Method #4-1] In an exemplary embodiment, X RBs may not be transmitted. That is, data to be transmitted may not be mapped to the X RBs. In this case, according to an exemplary embodiment, whether to transmit the X RBs may be signaled in combination with [Method #1] and/or [Method #2] described above.

[Method #4-2] In an exemplary embodiment, a separate precoding may be applied to the X RBs (i.e., a separate physical resource block group (PRG) may be configured for the X RBs) or a separate resource allocation unit (e.g., an RBG) may be applied to the X RBs. For example, the X RBs may be defined as one PRG or RBG or may be configured into a plurality of PRGs or RBGs. This is done because separate processing of the X RBs minimizes the effect on data transmitted in other RBs, considering that whether to transmit the X RBs is not clearly determined, or even if transmitted, performance may be degraded compared to other RBs.

[Method #4-3] In an exemplary embodiment, a separate CB/CBG/TB may be mapped to X RBs.

[Method #4-4] In an exemplary embodiment, data requiring high reliability (e.g., UCI) may not be transmitted in X RBs. Alternatively, in an exemplary embodiment, the reliability may be increased by setting the code rate of a CB/CBG/TB including the X RBs to be relatively low.

3.1.4A. [Method #4A] Method of Mapping Data to X/Y/Z/W RBs

Considering that the time interval between a CAP success time and the starting time of an actual DL/UL signal transmission is very short, such as a few sec, it may not be easy to apply a different signal/data mapping method depending on success/failure of the CAP (for a CAP subband) in terms of implementation of the BS and/or the UE.

In this regard, according to various embodiments of the present disclosure, a signal/data may not be mapped to RBs at a boundary of a CAP subband (e.g., X/Y/Z/W RBs in FIG. 10) in a transmission BW (by puncturing or rate matching) regardless of CAP success/failure in each CAP subband, during K symbols from the starting time of a DL/UL signal transmission. For example, referring to FIG. 20, data mapping may be performed for the operating BW, 40 MHz and then data mapped to the X/Y/Z/W RBs may be punctured. In another example, data may be mapped to RBs except for the X/Y/Z/W RBs in the operating BW, 40 MHz based on rate matching.

In an exemplary embodiment, K may be signaled or determined according to a UE capability. For example, K=1.

For example, referring to FIG. 10, it is assumed that the operating BW is 40 MHz, and an actual transmission BW or scheduled transmission BW is RBs corresponding to 40 MHz. In an exemplary embodiment, a DL/UL signal/data may not be mapped to the Y RBs at point A and/or the X RBs at point B and/or the Z RBs at point B and/or the W RBs at point C during K symbols at the beginning of the transmission regardless of a CAP result for each CAP subband.

In a specific example, a UL signal/data may not be mapped to the Y RBs at point A and/or the X RBs at point B and/or the Z RBs at point B and/or the W RBs at point C during the UL transmission in the RBs corresponding to 40 MHz.

In another specific example, the UE may not map a UL signal/data to the Y RBs at point A and/or the X RBs at point B during the UL transmission in RBs corresponding to 20 MHz.

In an exemplary embodiment, whether the X/Y/Z/W RBs are transmitted during the K symbols may be signaled in this case. For example, whether the X/Y/Z/W RBs are transmitted during the K symbols may be signaled in a combination of methods according to various embodiments of the present disclosure based on [method #1] and/or [method #2].

3.1.5. [Method #5] In-Band Emission

According to various embodiments of the present disclosure, an in-band emission requirement at a boundary of a CAP subband may be different from an in-band emission requirement within the CAP subband. More characteristically, the in-band emission requirement at the boundary of the CAP subband may be more stringent. This is for ensuring efficient coexistence between different operators and/or different RATs by minimizing interference with a node attempting a transmission or reception in an immediate adjacent (neighboring) CAP subband.

For example, referring to FIG. 10, when a transmission is performed only in 20 MHz (part A), the in-band emission requirement for the X RBs and/or Z RBs (because 40 MHz is the operating BW, the in-band emission requirement may be applied even though the Z RBs are not actually transmitted) may be more stringent than the in-band emission requirement for the other RBs within the CAP subband, in consideration of nodes that are likely to perform transmissions and receptions in 20 MHz (part B).

In an exemplary embodiment, X and/or Y and/or Z (and/or W) may be predefined.

Alternatively, in an exemplary embodiment, the value of X and/or Y and/or Z (and/or W) may be configured by RRC signaling. Unless the value of X and/or Y and/or Z (and/or W) is not configured by RRC signaling, an available default X and/or Y and/or Z (and/or W) may be predefined. That is, for example, upon receipt of RRC signaling that configures X and/or Y and/or Z (and/or W), the UE may obtain a configured value as X/Y/Z and/or W. In another example, when the UE fails in receiving the RRC signaling, the UE may obtain the value of X/Y/Z and/or W according to a preconfigured or predefined default value.

Alternatively, in an exemplary embodiment, X and/or Y and/or Z (and/or W) may be configured/defined differently according to a numerology (e.g., an SCS, for example, the SCS of the unlicensed band) and/or the size of a (transmission or operating) BW.

For example, Y (i.e., the number Y of RBs) at point A may be set differently depending on a transmission in 40 MHz or a transmission in 20 MHz (part A). In another example, X (i.e., the number X of RBs) at point B may be set differently for a transmission in 20 MHz (part A) depending on SCS=15 kHz or 30 kHz.

3.2. Method of Transmitting and Receiving DL Control Channel and Data Channel

Figure 13:
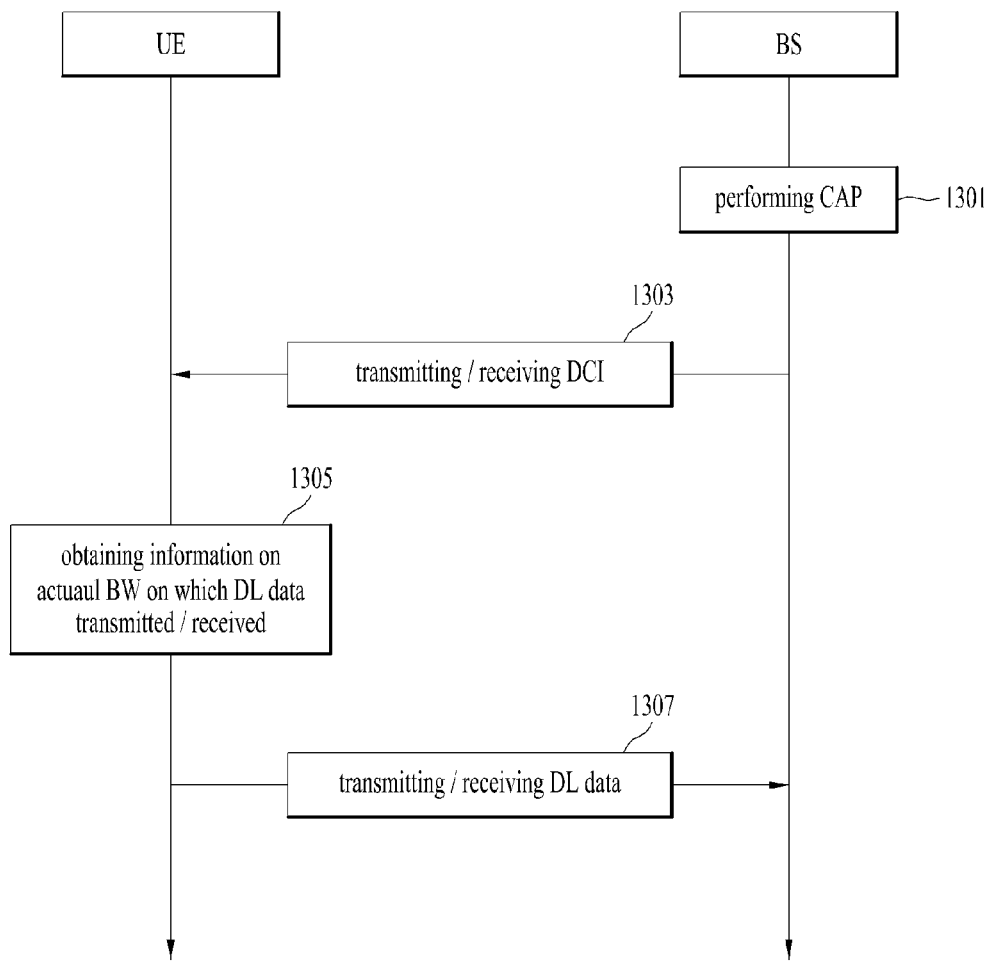
FIG. 13 is a diagram illustrating a signal flow for operations of a UE and a BS according to various embodiments of the present disclosure.

FIG. 13 is a diagram illustrating a signal flow for operations of a UE and a BS according to various embodiments of the present disclosure. Specifically, FIG. 13 illustrates an operation of transmitting and receiving a DL control/data channel in an unlicensed band between a UE and a BS according to various embodiments of the present disclosure.

Referring to FIG. 13, in an exemplary embodiment, the BS may transmit DCI (or a PDCCH) to the UE in the unlicensed band by performing (or using) a CAP in a method according to various embodiments of the present disclosure in operations 2301 and 2303.

In an exemplary embodiment, the UE may receive the DCI (or PDCCH) in the unlicensed band in a method according to various embodiments of the present disclosure in operation 2303.

In an exemplary embodiment, the UE may obtain information about an actual BW in which DL data is transmitted in a method according to various embodiments of the present disclosure in operation 2305. For example, the UE may obtain the information about the actual BW in which the DL data is transmitted from an initial signal and/or common DCI and/or a DM-RS as described later.

In an exemplary embodiment, the BS may transmit the DL data to the UE in a method according to various embodiments of the present disclosure in operation 2307. In an exemplary embodiment, the BS may transmit the DL data to the UE based on the result of the CAP performed in operation 2301, in operation 2307. That is, in an exemplary embodiment, the BS may transmit both a DL control channel and a DL data channel by one CAP in operation 2307. Alternatively, in an exemplary embodiment, the BS may perform a CAP separately for the DL data transmission.

In an exemplary embodiment, the UE may receive the DL data from the BS in a method according to various embodiments of the present disclosure in operation 2307.

Each of the above operations in various embodiments of the present disclosure according to subclause 3.2. will be described in detail. It will be clearly understood to those skilled in the art that various embodiments of the present disclosure described below may be combined fully or partially to constitute other various embodiments of the present disclosure, unless contradicting each other.

3.2.1. [Method #1] Method of Transmitting and Receiving DL Control Channel 3.2.1.1a. [Method #1a] BS Operation According to various embodiments of the present disclosure, when the BS configures a CORESET over one or more CAP subbands and actually transmits only some CAP subband(s) in which the BS has succeeded a CAP, the BS may transmit only a PDCCH with all REs included in the CAP subband(s) or one of the CAP subband(s).

In an exemplary embodiment, a CORESET may refer to an area in which a PDCCH may be transmitted. Specifically, the CORESET may be time-frequency resources in which the UE attempts to decode candidate control channels by using one or more search spaces.

In an exemplary embodiment, a CORESET may have a configuration including information such as the number of symbols, the size of a frequency area, and a precoding size.

For example, referring to FIG. 10, a CORESET may be configured over 40 MHz, in which some PDCCH candidate(s) may belong to 20 MHz (part A) with other PDCCH candidate(s) belonging to 20 MHz (part B), and some control channel elements (CCEs) of other PDCCH candidate(s) belong to 20 MHz (part A), with the other CCEs belonging to 20 MHz (part B).

In an exemplary embodiment, when the BS succeeds in a CAP only for 20 MHz (part A) and transmits a signal only in the corresponding BW, the BS may transmit PDCCH(s) belonging only to 20 MHz (part A) without transmitting a PDCCH belonging to 20 MHz (part B) even when only some CCEs of the PDCCH belong to 20 MHz (part B). In an exemplary embodiment, the BS may transmit an initial signal to indicate the transmission BW 20 MHz to the UE. For example, the BS may indicate the transmission of the PDCCH only in 20 MHz (part A) to the UE by the initial signal. That is, the BS may indicate the subband carrying the actual PDCCH in the wideband to the UE by the initial signal, and the UE may transmit the PDCCH later in the subband (2 steps).

In an exemplary embodiment, when it is said that a PDCCH belongs to or is transmitted in 20 MHz (part A), this may mean that the PDCCH belongs to or is transmitted in RBs except for the Y RBs at point A and/or the X RBs at point B in FIG. 10.

3.2.1.1a. [Method #1b] UE Operation (Corresponding to BS Operation in Method #1a)

According to various embodiments of the present disclosure, when a CORESET is configured over a plurality of subbands, the UE may identify actual transmission CAP subbands of the BS by bind detection of an initial signal. Then, the UE may perform blind detection only on a PDCCH with all REs included in the CAP subbands identified as transmitted from the BS or only one of the CAP subbands (2 steps).

For example, referring to FIG. 10, a CORESET may be configured over 40 MHz, in which some PDCCH candidate(s) may belong to 20 MHz (part A) with the other PDCCH candidate(s) belonging to 20 MHz (part B), and some CCEs of other PDCCH candidate(s) belong to 20 MHz (part A), with the other CCEs belonging to 20 MHz (part B).

In an exemplary embodiment, when the UE determines that the BS has transmitted a signal only in 20 MHz (part A) as a result of blind detection of the initial signal, the UE may perform blind detection only on the PDCCH candidate(s) belonging only to 20 MHz (part A), without blind detection of PDCCH candidate(s) with at least a part of CCEs belonging to 20 MHz (part B).

In an exemplary embodiment, when it is said that a PDCCH belongs to or is received in 20 MHz (part A), this may mean that the PDCCH belongs to or is received in RBs except for the Y RBs at point A and/or the X RBs at point B in FIG. 10.

3.2.2. [Method #2] Method of Transmitting and Receiving DL Data Channel
3.2.2.1a. [Method 1a] BS Operation According to various embodiments of the present disclosure, the BS may transmit an initial signal only in an actual transmission BW. Alternatively according to various embodiments of the present disclosure, the BS may indicate the actual BW to the UE by common DCI or UE-specific DCI.

In an exemplary embodiment, the common DCI or the UE-specific DCI may be received in a licensed band or an unlicensed band.

In an exemplary embodiment, the actual transmission BW may be an inter multiple of the BW of a CAP subband.

According to various embodiments of the present disclosure, the BS may explicitly indicate the actual transmission BW of a DL transmission to the UE by the initial signal (or a PDSCH DM-RS).

For example, when the initial signal (or PDSCH DM-RS) is a gold sequence, the BS may transmit the initial signal (or PDSCH DM-RS) by applying a (configured or predefined) separate scrambling seed and/or OCC and/or comb index and/or port index according to a transmission BW combination.

Alternatively, for example, when the initial signal (PDSCH DM-RS) is a CAZAC sequence or Zadoff-Chu sequence, the BS may transmit the initial signal (or PDSCH DM-RS) by applying a (configured or predefined) separate root index and/or cyclic index and/or port index according to a transmission BW combination.

3.2.2.1b. [Method #1b] BS Operation (Corresponding to BS Operation in Method #1a)

According to various embodiments of the present disclosure, the UE may detect the actual transmission BW of the BS by blind detection of an initial signal. Alternatively, according to various embodiments of the present disclosure, the UE may receive information about the actual transmission BW of the BS in common DCI or UE-specific DCI.

In an exemplary embodiment, the common DCI or the UE-specific DCI may be received in a licensed band or an unlicensed band.

In an exemplary embodiment, the actual transmission BW may be an inter multiple of the BW of a CAP subband.

For example, even though a PDSCH is scheduled over the entire 40 MHz in slot #n by DCI, when the UE detects that the PDSCH is transmitted only in 20 MHz (part A) by blind detection of an initial signal in slot #n, the UE may receive the PDSCH, assuming that the scheduled PDSCH area is only 20 MHz (part A). In an exemplary embodiment, when a part of a CB/CBG/TB transmittable in 20 MHz (part B) is transmitted in 20 MHz (part A), the UE may flush corresponding decoded CB/CBG/TB information from the reception buffer. For example, the UE may empty PDSCH information decoded in the CB/CBG/TB from the reception buffer.

Alternatively, for example, the UE may receive, from the BS, signaling indicating whether a transmission has been performed in some CAP subband in slot #n, in retransmission DCI of HARQ ID #0 after receiving a whole PDSCH area in slot #n, scheduled by DCI (when a PDSCH corresponding HARQ ID #0 is scheduled in slot #n).

For example, upon receipt of signaling indicating transmission only in 20 MHz (part A) or requesting flush of a buffer corresponding to the received signal, the UE may flush the buffer corresponding to a signal received in 20 MHz (part B). At the same time, upon receipt of a part of a CB/CBG/TB transmittable in 20 MHz (part B) in 20 MHz (part A), the UE may flush corresponding decoded CB/CBG/TB information from the reception buffer.

According to various embodiments of the present disclosure, when blind-detecting/receiving an initial signal (or PDSCH DM-RS), the UE may detect/identify the DL transmission BW of the BS according to a received sequence among initial signals (or DM-RSs) preconfigured or predefined according to actual transmission BW combinations of the BS.

For example, when the initial signal (or PDSCH DM-RS) is a gold sequence, a scrambling seed and/or OCC and/or comb index and/or port index may be configured separately according to a transmission BW combination.

Alternatively, for example, when the initial signal (PDSCH DM-RS) is a CAZAC sequence or Zadoff-Chu sequence, a root index and/or cyclic index and/or port index may be configured separately according to a transmission BW combination.

3.2.2.2a. [Method #2a] BS Operation

According to various embodiments of the present disclosure, when a CAP is successful only in a CAP subband occupied by a PDSCH (and/or a PUCCH) transmitted to the UE in the operating BW, transmission of the PDSCH (and/or the PDCCH) may be allowed.

In an exemplary embodiment, the operating BW may be particularly the BW of an active DL BWP indicated to the specific UE.

For example, referring to FIG. 10, when the BS, which schedules a PDSCH for the UE for which the operating BW (or active BWP) is 40 MHz, intends to transmit the PDSCH to the UE only in an RB area belonging to 20 MHz (part A), the BS may be allowed to transmit the PDSCH to the UE, as far as the BS succeeds in a CAP for the subband of 20 MHz (part A) (even though the BS fails in a CAP for the subband of 20 MHz (part B)).

3.2.2.ba. [Method #2b] UE Operation (Corresponding to BS Operation in Method #2a)

According to various embodiments of the present disclosure, although the BS is allowed to transmit a signal even though a CAP is successful in some CAP subband of the operating BW (e.g., particularly, the BW of an active DL BWP indicated to the specific UE), the BS should succeed in a CAP for a CAP subband including a PDSCH scheduled for the UE. Therefore, the UE may assume that the PDSCH is always received successfully in scheduled RBs.

3.2.2.3a. [Method #3] BS Operation

According to various embodiments, the BS may transmit one TB in each CAP subband with a different or the same redundancy version (RV) (repeatedly).

That is, according to various embodiments, even though the BS fails in a CAP for a specific subband and thus does not transmit a signal in a part of the operating BW (due to puncturing), the BS may transmit a data channel in a manner that enables recovery of the data channel.

For example, referring to FIG. 10, the same TB may be repeatedly mapped to 20 MHz (part A) and 20 MHz (part B).

3.2.2.3b. [Method #3b] UE Operation (Corresponding to BS Operation in Method #3a)

According to various embodiments, the UE may receive one TB in each CAP subband with a different or the same RV.

That is, according to various embodiments, even though a part of the operating BW is punctured and thus is not received due to CAP failure in a specific subband, the UE may receive a data channel in a recoverable manner.

The various embodiments of the present disclosure described above are some of various implementation schemes of the present disclosure, and it is clearly understood by those skilled in the art that various embodiments of the present disclosure are not limited to the above-described embodiments. While the various embodiments of the present disclosure described above may be independently implemented, other various embodiments of the present disclosure may be configured by combining (or merging) some embodiments. It may be regulated that information indicating whether to apply the various embodiments of the present disclosure described above (or information about the rules of the various embodiments of the present disclosure described above) is indicated by a signal (e.g., a physical-layer signal or a higher-layer signal) predefined for the UE by the BS.

Figure 14:
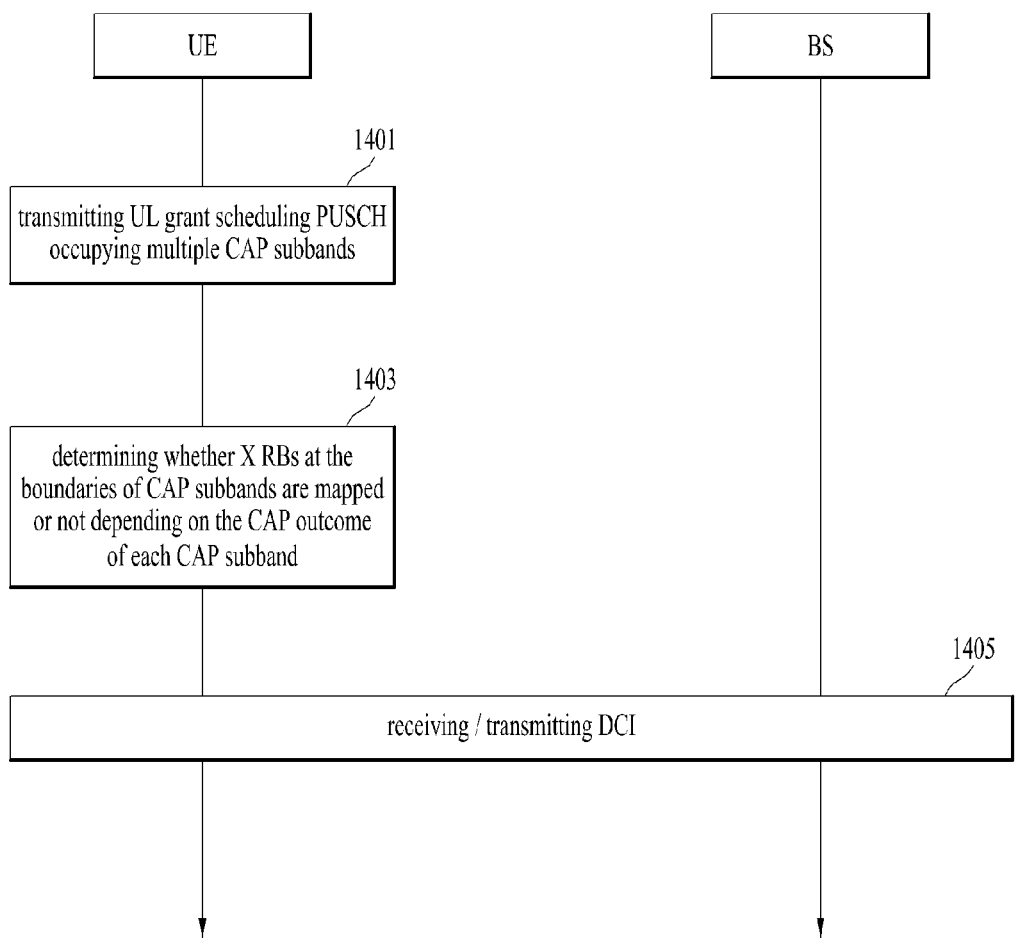
FIG. 14 is a diagram illustrating a signal flow for operations of a UE and a BS according to various embodiments of the present disclosure.

FIG. 14 is a diagram illustrating a signal flow for operations of a UE and a BS according to various embodiments of the present disclosure.

Figure 15:
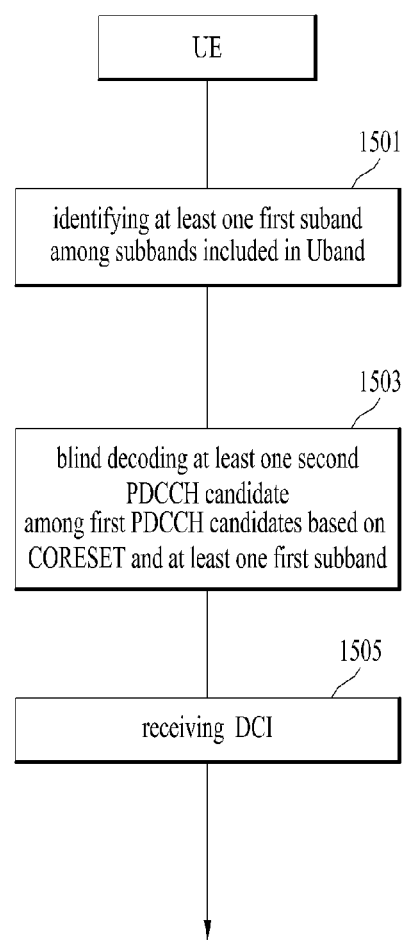
FIG. 15 is a flowchart illustrating a method of operating a UE according to various embodiments of the present disclosure.

FIG. 15 is a flowchart illustrating a method of operating a UE according to various embodiments of the present disclosure.

Figure 16:
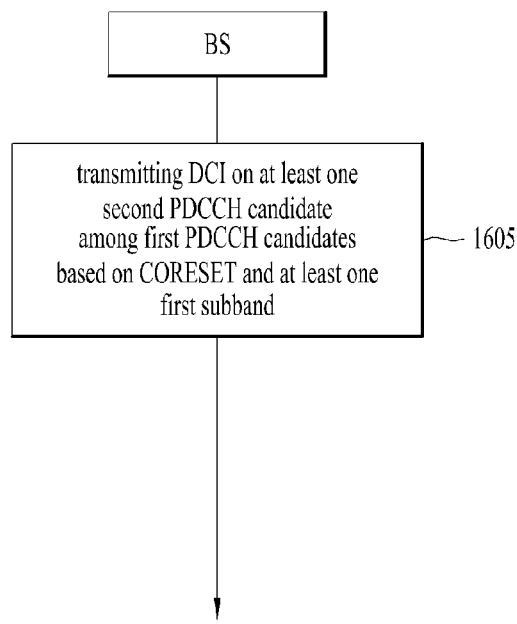
FIG. 16 is a flowchart illustrating a method of operating a BS according to various embodiments of the present disclosure.

FIG. 16 is a flowchart illustrating a method of operating a BS according to various embodiments of the present disclosure.

Referring to FIGS. 14, 15 and 16, in an exemplary embodiment, the UE may identify at least one first subband occupied by the BS among a plurality of subbands included in an unlicensed band in operations 1401 and 1501.

In an exemplary embodiment, the UE may blind-decode at least one first PDCCH candidate among a plurality of PDCCH candidates configured in a CORESET configured over the plurality of subbands, based on the CORESET and the at least one first subband in operations 1403 and 1503.

In an exemplary embodiment, DCI may be transmitted and received between the UE and the BS in operations 1405, 1505, and 1605. That is, the UE may receive the DCI from the BS based on the blind decoding in operations 1405 and 1505 according to an exemplary embodiment.

In an exemplary embodiment, at least one CCE occupied by the at least one first PDCCH candidate may be included in the at least one first subband.

In an exemplary embodiment, the at least one first subband may be any one of the plurality of subbands.

A more specific operation of the BS and/or the UE according to various embodiments of the present disclosure may be described and performed based on the afore-described clauses 1 to 3.

4. Apparatus Configuration

In the present specification, various embodiments of the present disclosure have been described, focusing on a data transmission/reception relationship between a BS and a UE in a wireless communication system. However, various embodiments of the present disclosure are not limited thereto. For example, various embodiments of the present disclosure may also relate to the following technical configurations.

(Processors included in) devices according to various embodiments of the present disclosure described below may perform operations in a combination of the afore-described embodiments in clause 1 to clause 3, unless contradicting each other.

Example of Communication System to which
Various Embodiments of the Present Disclosure are
Applied The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
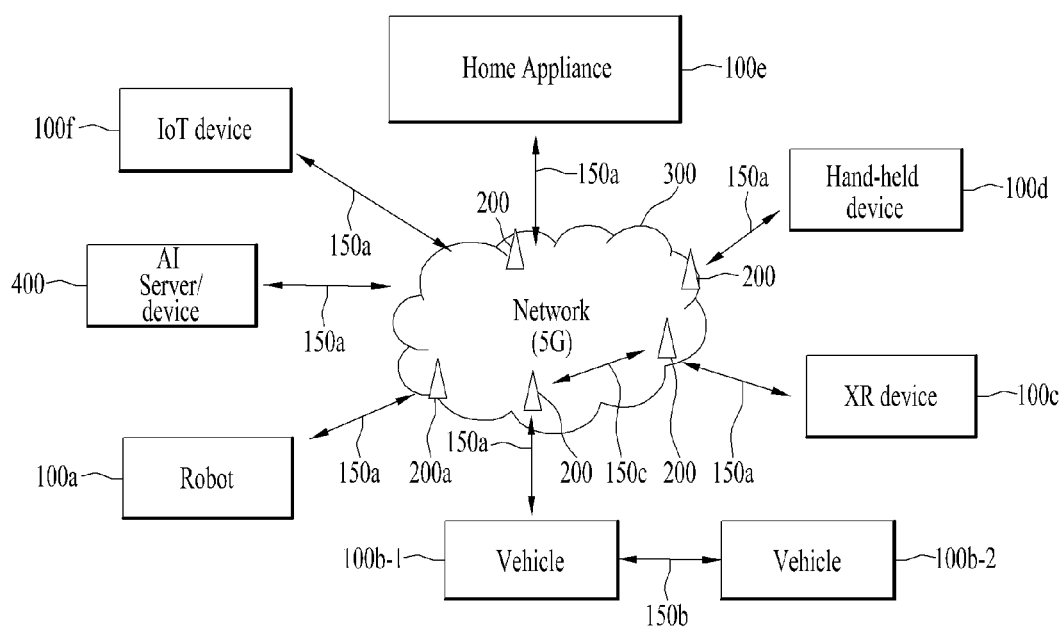
FIG. 17 is a diagram illustrating a communication system to which various embodiments of the present disclosure are applicable.

FIG. 17 illustrates an exemplary communication system to which various embodiments of the present disclosure are applied.

Referring to FIG. 17, a communication system 1 applied to the various embodiments of the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart pad, a wearable device (e.g., a smart watch or a smart glasses), and a computer (e.g., a notebook). The home appliance may include a TV, a refrigerator, and a washing machine. The IoT device may include a sensor and a smart meter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 18:
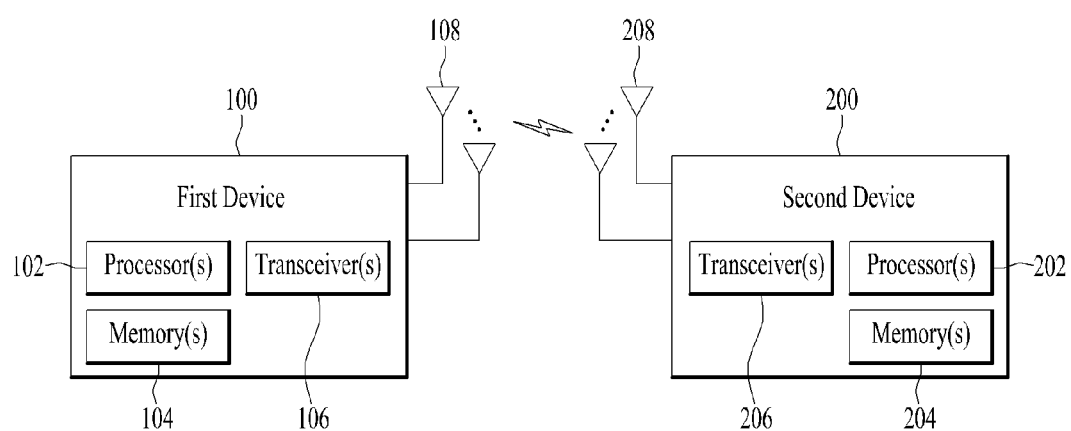
FIG. 18 is a block diagram illustrating wireless devices to which various embodiments of the present disclosure are applicable.

Example of Wireless Devices to which Various Embodiments of the Present Disclosure are Applied FIG. 18 illustrates exemplary wireless devices to which various embodiments of the present disclosure are applicable.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s)

202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
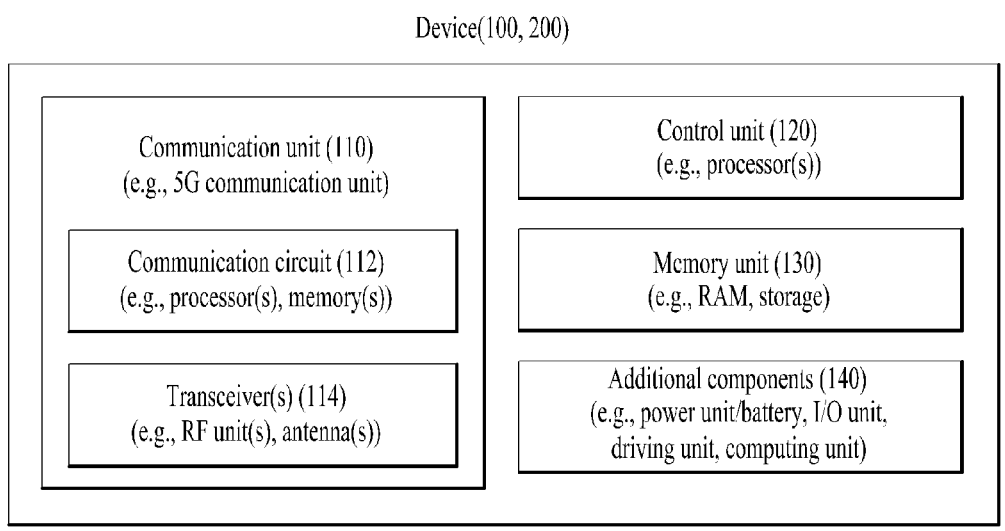
FIG. 19 is a block diagram illustrating another example of wireless devices to which various embodiments of the present disclosure are applicable.

Example of Using Wireless Devices to which Various Embodiments of the Present Disclosure are Applied FIG. 19 illustrates other exemplary wireless devices to which various embodiments of the present disclosure are applied. The wireless devices may be implemented in various forms according to a use case/service (see FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors.

As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
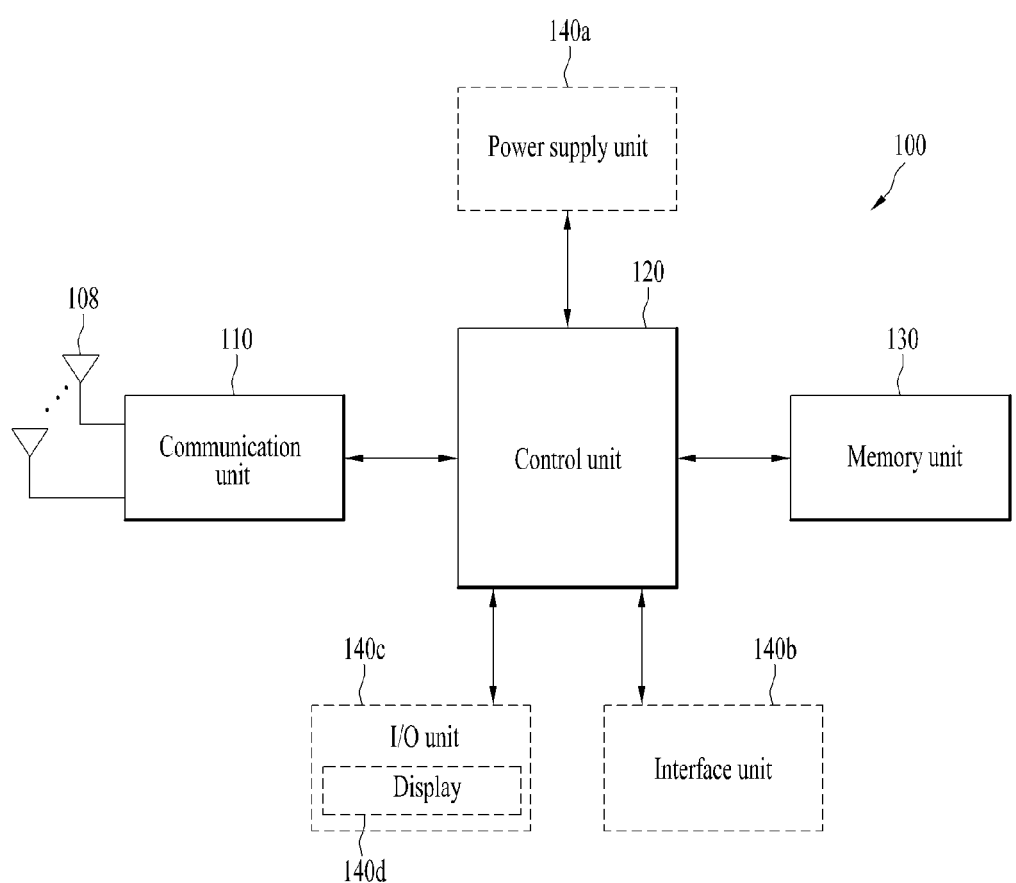
FIG. 20 is a block diagram illustrating a portable device applied to various embodiments of the present disclosure.

Example of Portable Device to which Various Embodiments of the Present Disclosure are Applied FIG. 20 illustrates an exemplary portable device to which various embodiments of the present disclosure are applied. The portable device may be any of a smartphone, a smart pad, a wearable device (e.g., a smart watch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
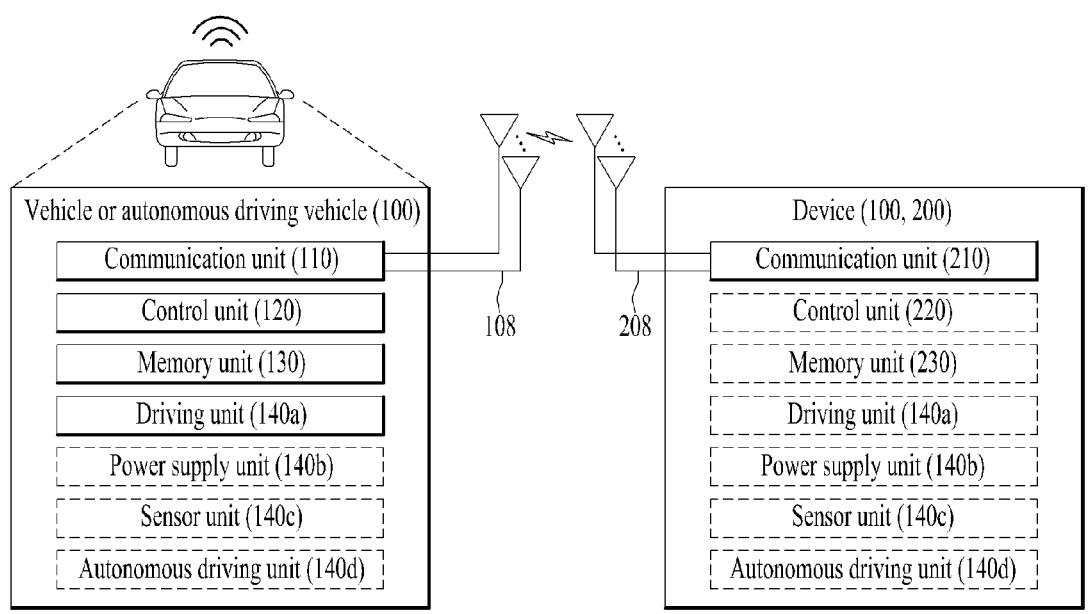
FIG. 21 is a block diagram illustrating a vehicle or an autonomous driving vehicle, which is applied to various embodiments of the present disclosure.

Example of Vehicle or Autonomous Driving Vehicle to which Various Embodiments of the Present Disclosure FIG. 21 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an electronic control unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory and executed by the processor. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Various embodiments of the present disclosure are applicable to UEs, BSs, and/or other various equipment in various wireless communication systems.

The invention claimed is:
1. A method of receiving downlink control information (DCI) by an User Equipment (UE) in a wireless communication system, the method comprising:
identifying, for each subband among a plurality of subbands included in a shared spectrum, whether the subband is available for reception of a signal;
monitoring, based on a control resource set (CORESET) configured over the plurality of subbands, a plurality of physical downlink control channel (PDCCH) candidates in the CORESET; and
receiving the DCI based on the monitoring,
wherein, based on one or more PDCCH candidates, among the plurality of PDCCH candidates, being overlapped with at least a part of a subband, among the plurality of subbands, that is identified as not available for the reception of the signal, the one or more PDCCH candidates are not monitored.

2. The method of claim 1, wherein for each subband, the identifying is based on:
a predefined signal being received in the subband, or
information indicating the subband is included in the predefined signal.

3. The method of claim 1, wherein each of the plurality of subbands is related to a basic frequency unit of a channel access procedure (CAP) for the shared spectrum.

4. An User Equipment (UE) configured to receive downlink control information (DCI) in a wireless communication system, the UE comprising:
a processor; and
at least one memory storing instructions causing, when executed, the processor to perform operations comprising:
identifying, for each subband among a plurality of subbands included in a shared spectrum, whether the subband is available for reception of a signal;
monitoring, based on a control resource set (CORESET) configured over the plurality of subbands, a plurality of physical downlink control channel (PDCCH) candidates in the CORESET; and
receiving the DCI based on the monitoring,
wherein, based on one or more PDCCH candidates, among the plurality of PDCCH candidates, being overlapped with at least a part of a subband, among the plurality of subbands, that is identified as not available for the reception of the signal, the one or more PDCCH candidates are not monitored.

5. The UE of claim 4, wherein for each subband, the identifying is based on:
a predefined signal being received in the subband, or
information indicating the subband is included in the predefined signal.

6. The UE of claim 4, wherein each of the plurality of subbands is related to a basic frequency unit of a channel access procedure (CAP) for the shared spectrum.

7. The UE of claim 4, wherein the UE is configured to communicate with at least one of a mobile terminal, a network, or an autonomous driving vehicle other than a vehicle comprising the UE.

8. An User Equipment (UE) configured to transmit downlink control information (DCI) in a wireless communication system, the UE comprising:

a processor; and at least one memory storing instructions causing, when executed, the processor to perform operations comprising:

performing a channel access procedure (CAP) for determining, for each subband among a plurality of subbands included in a shared spectrum, whether the subband is available for transmission of a signal, and transmitting, based on a control resource set (CORESET) configured over the plurality of subbands, the DCI in one of a plurality of physical downlink control channel (PDCCH) candidates configured in the CORESET, and wherein, based on one or more PDCCH candidates, among the plurality of PDCCH candidates, being overlapped with at least a part of a subband, among the plurality of subbands, that is identified as not available for the transmission of the signal, the DCI is not transmitted on the one or more PDCCH candidates.

* * * * *